Sept. 10, 1946.                     E. S. HINELINE                     2,407,277
                   MOTOR-DRIVEN CURTAIN-SHUTTER AND RELEASE
                       MECHANISM FOR PHOTOGRAPHIC CAMERAS
                    Original Filed Oct. 19, 1943    10 Sheets-Sheet 1
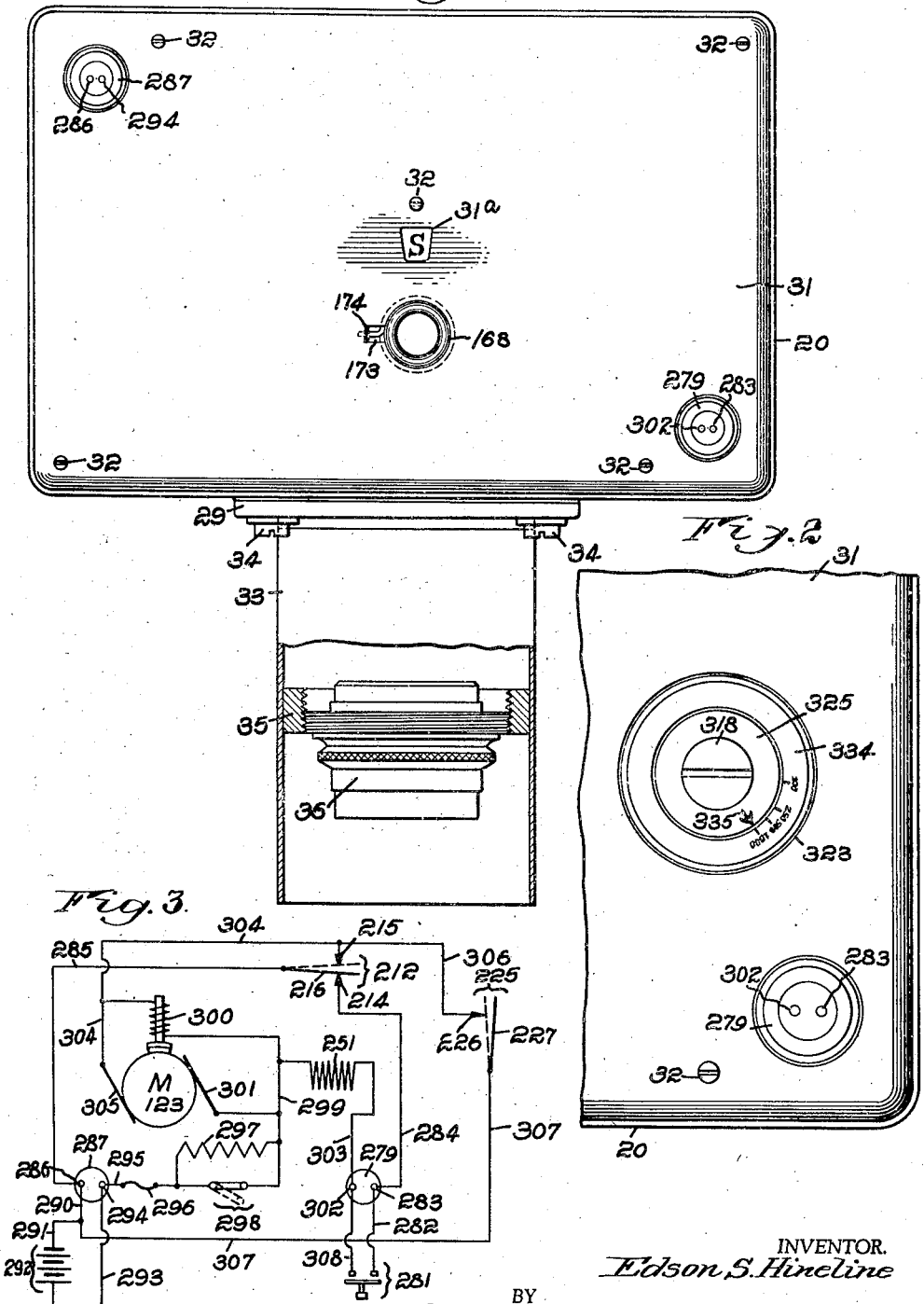
INVENTOR.
Edson S. Hineline
BY
his Attorneys Sept. 10, 1946.  E. S. HINELINE  2,407,277
MOTOR-DRIVEN CURTAIN-SHUTTER AND RELEASE
MECHANISM FOR PHOTOGRAPHIC CAMERAS
Original Filed Oct. 19, 1943  10 Sheets-Sheet 2
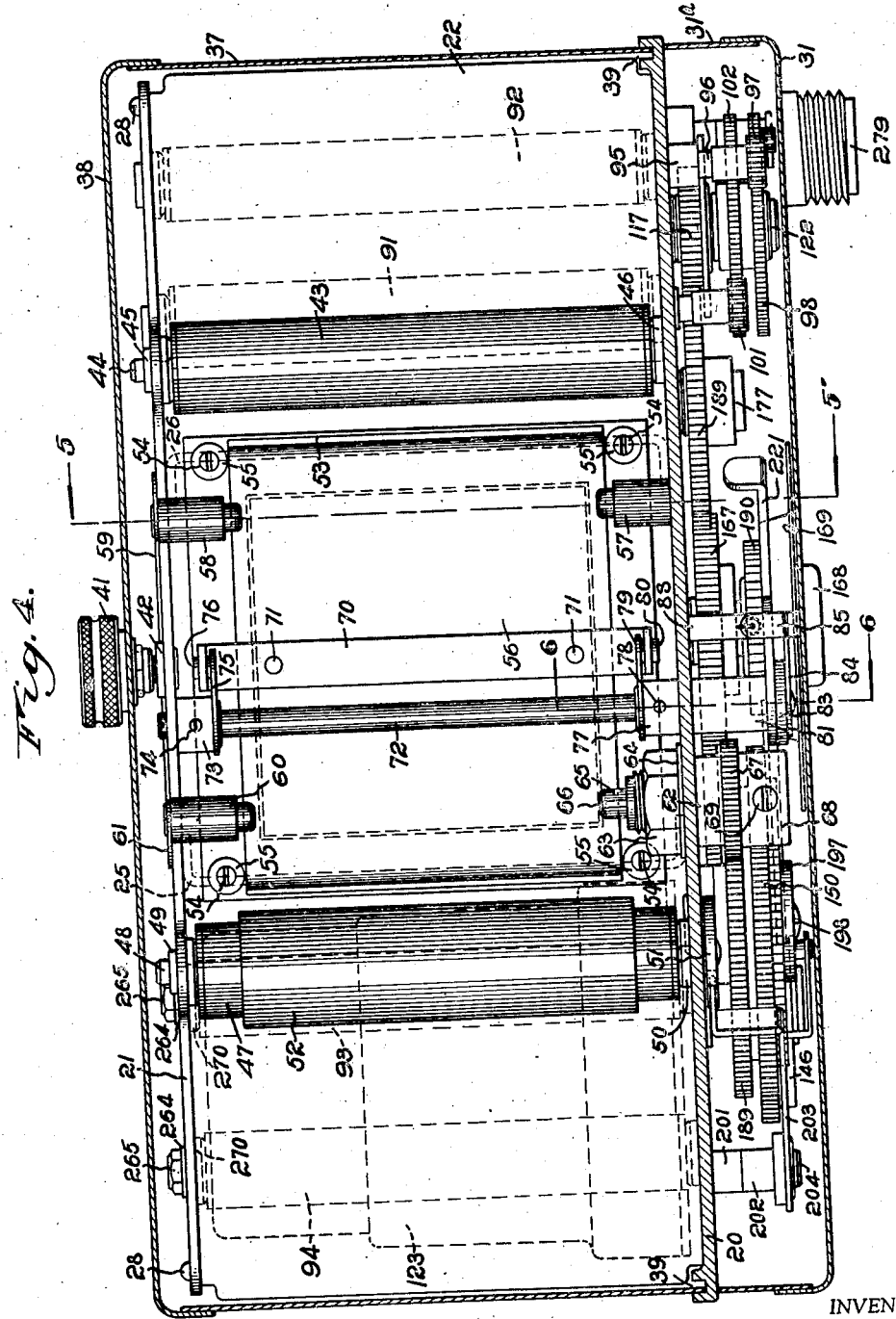
INVENTOR.
Edson S. Hineline
BY
his Attorneys

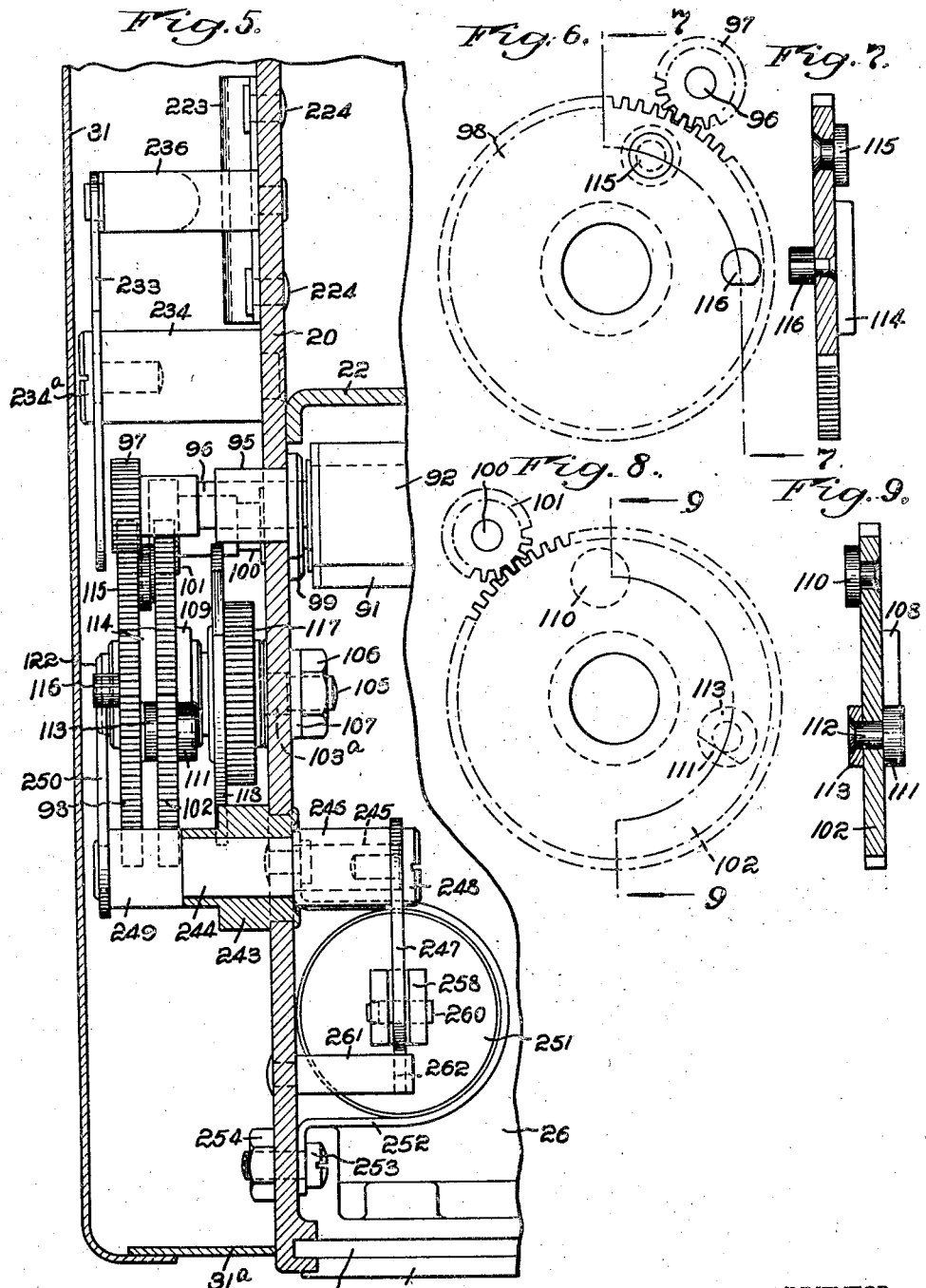

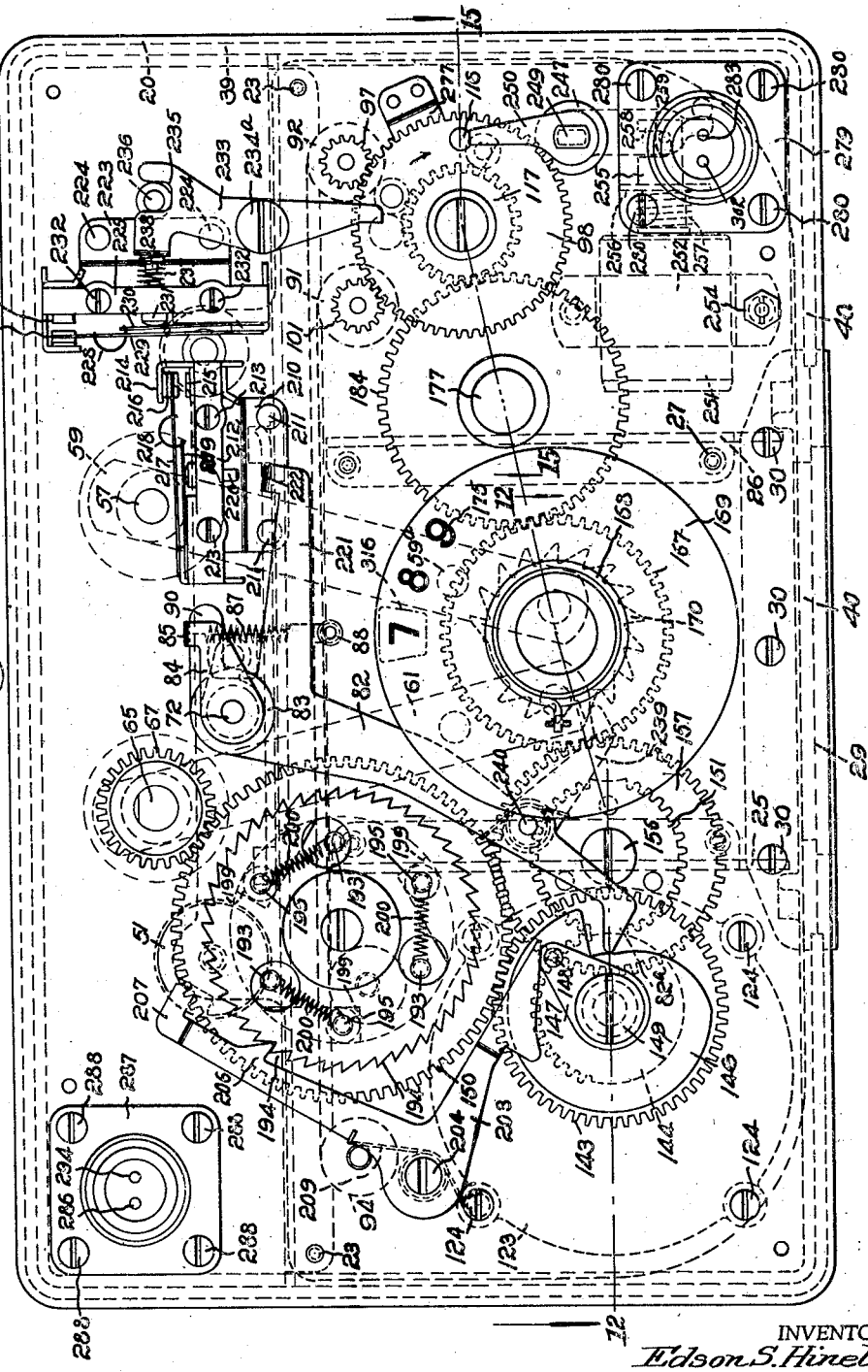

Sept. 10, 1946.    E. S. HINELINE    2,407,277
MOTOR-DRIVEN CURTAIN-SHUTTER AND RELEASE
MECHANISM FOR PHOTOGRAPHIC CAMERAS
Original Filed Oct. 19, 1943    10 Sheets-Sheet 5

INVENTOR.
Edson S. Hineline
BY
Emery, Booth, Townsend, Miller & Davidson
his Attorneys

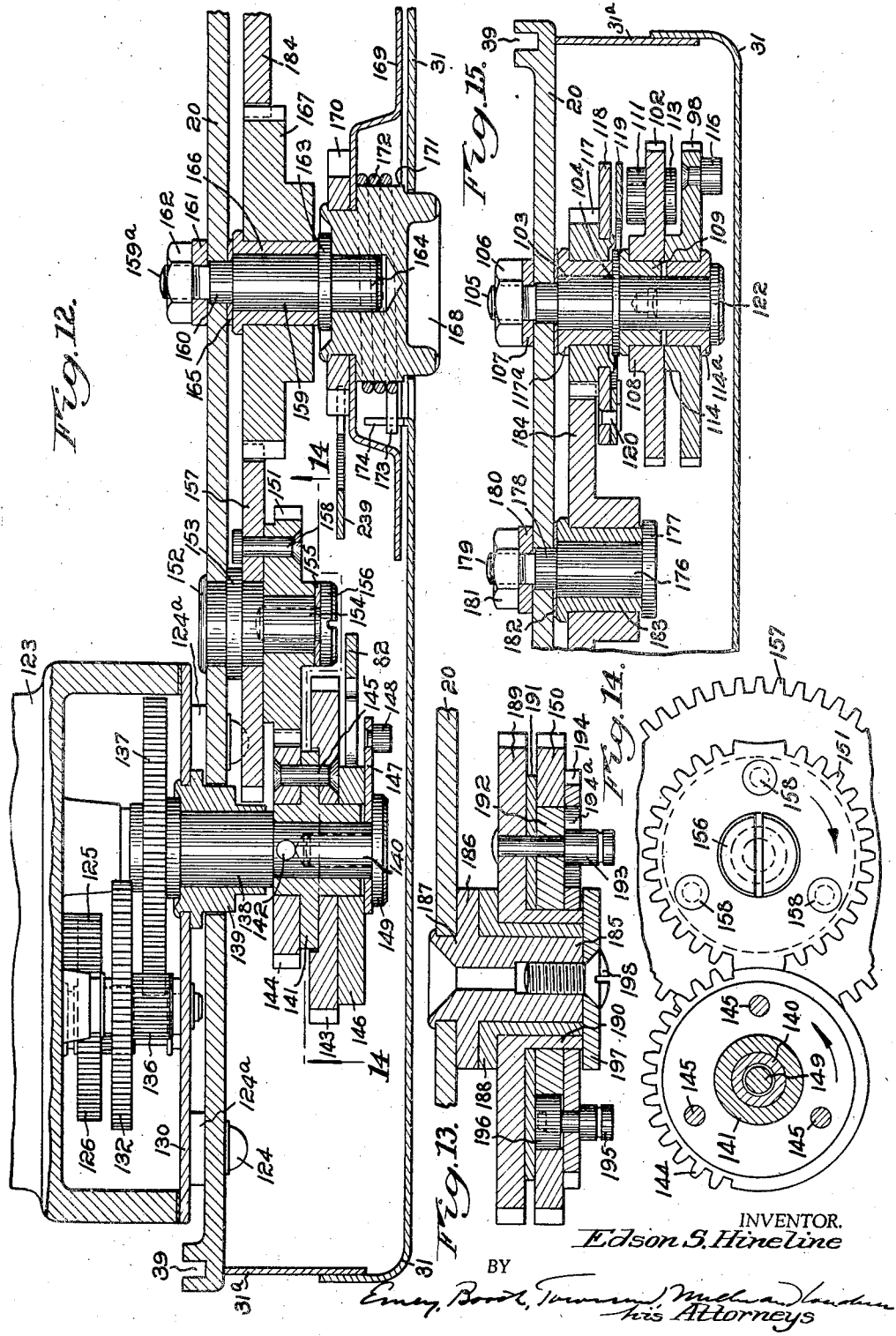

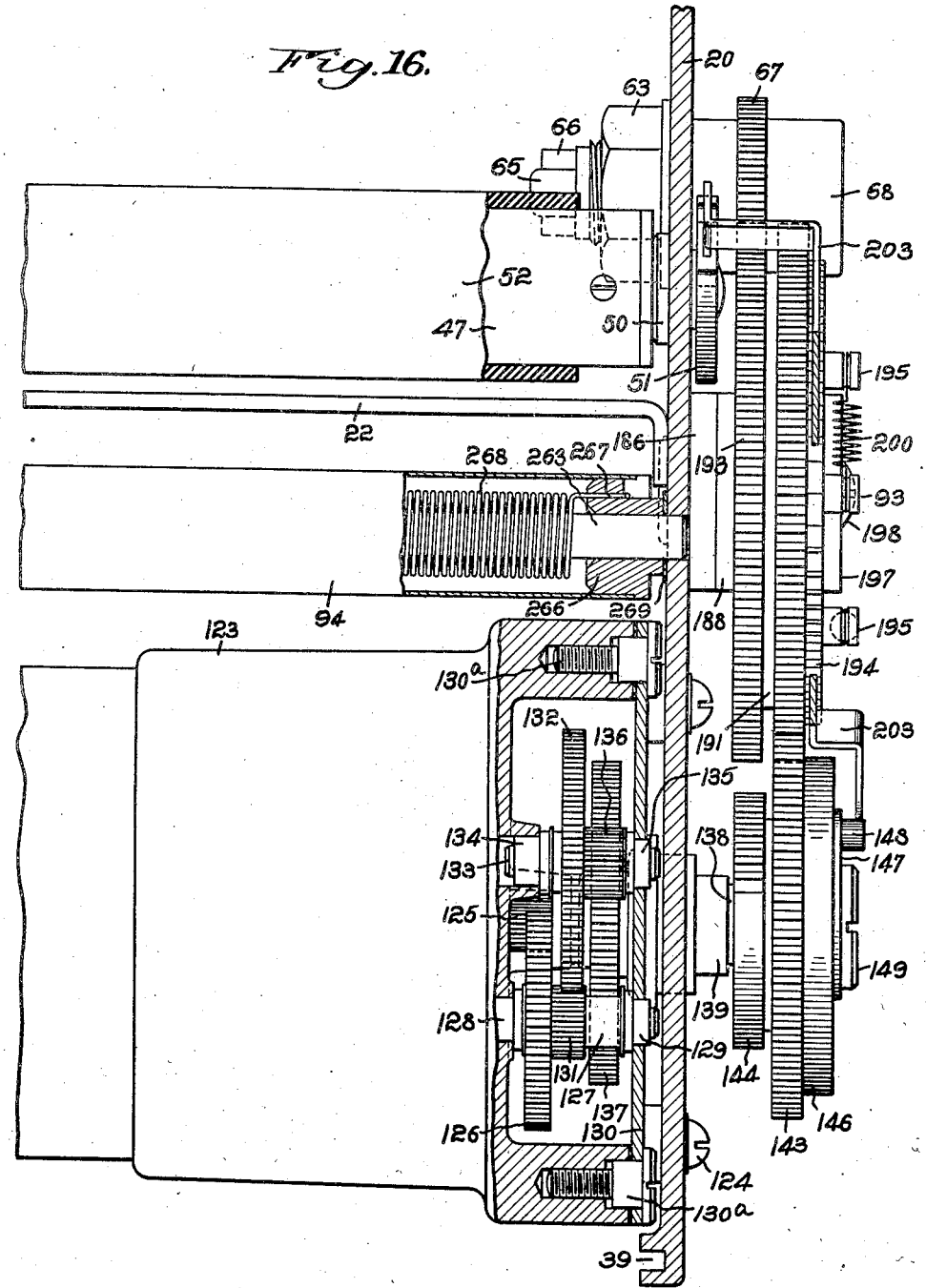

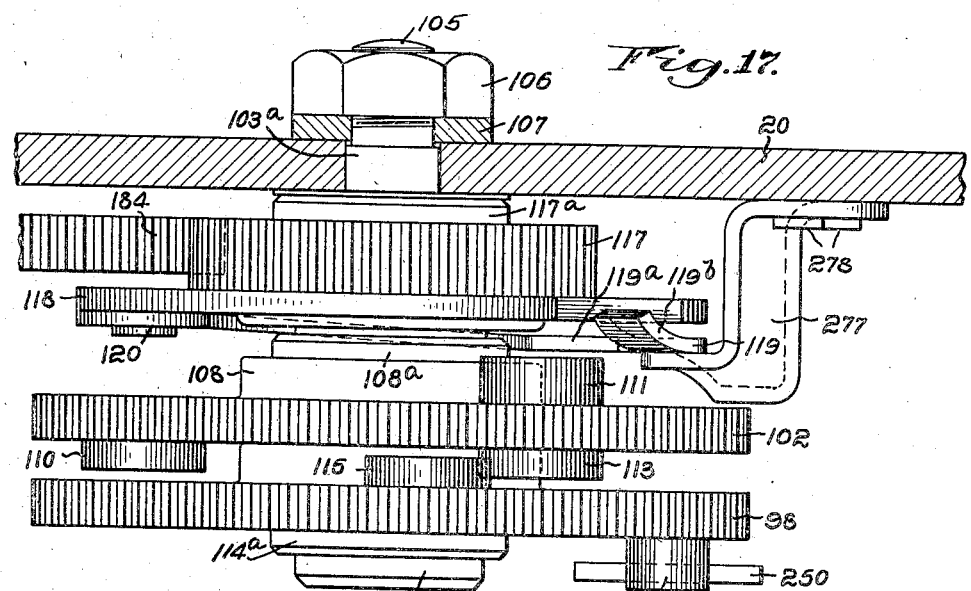
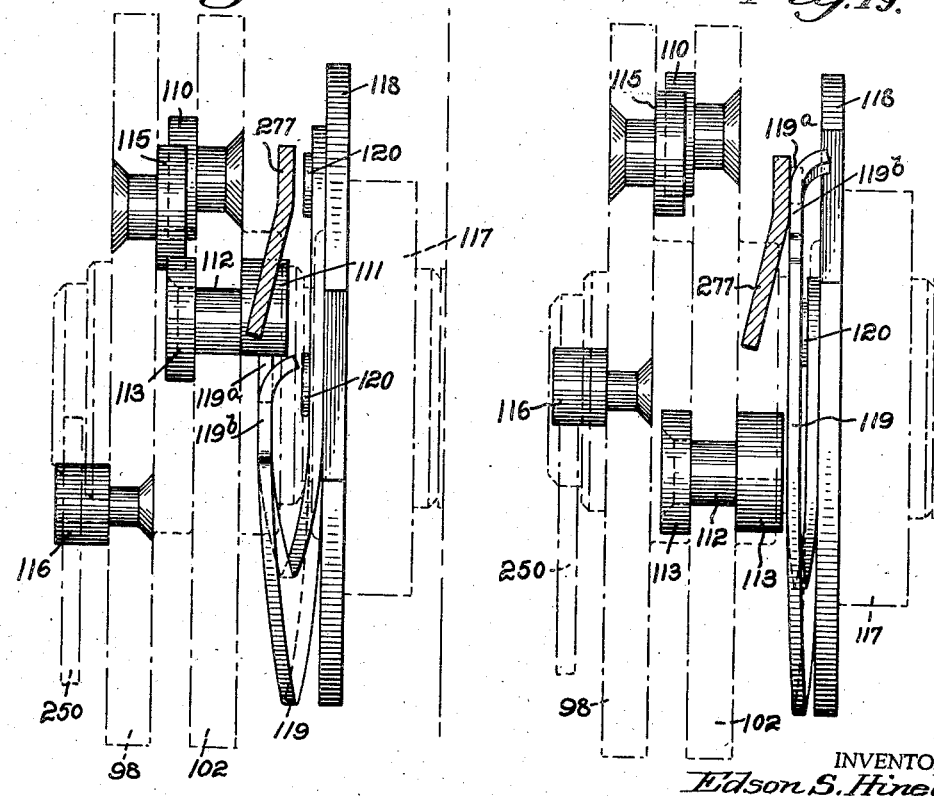

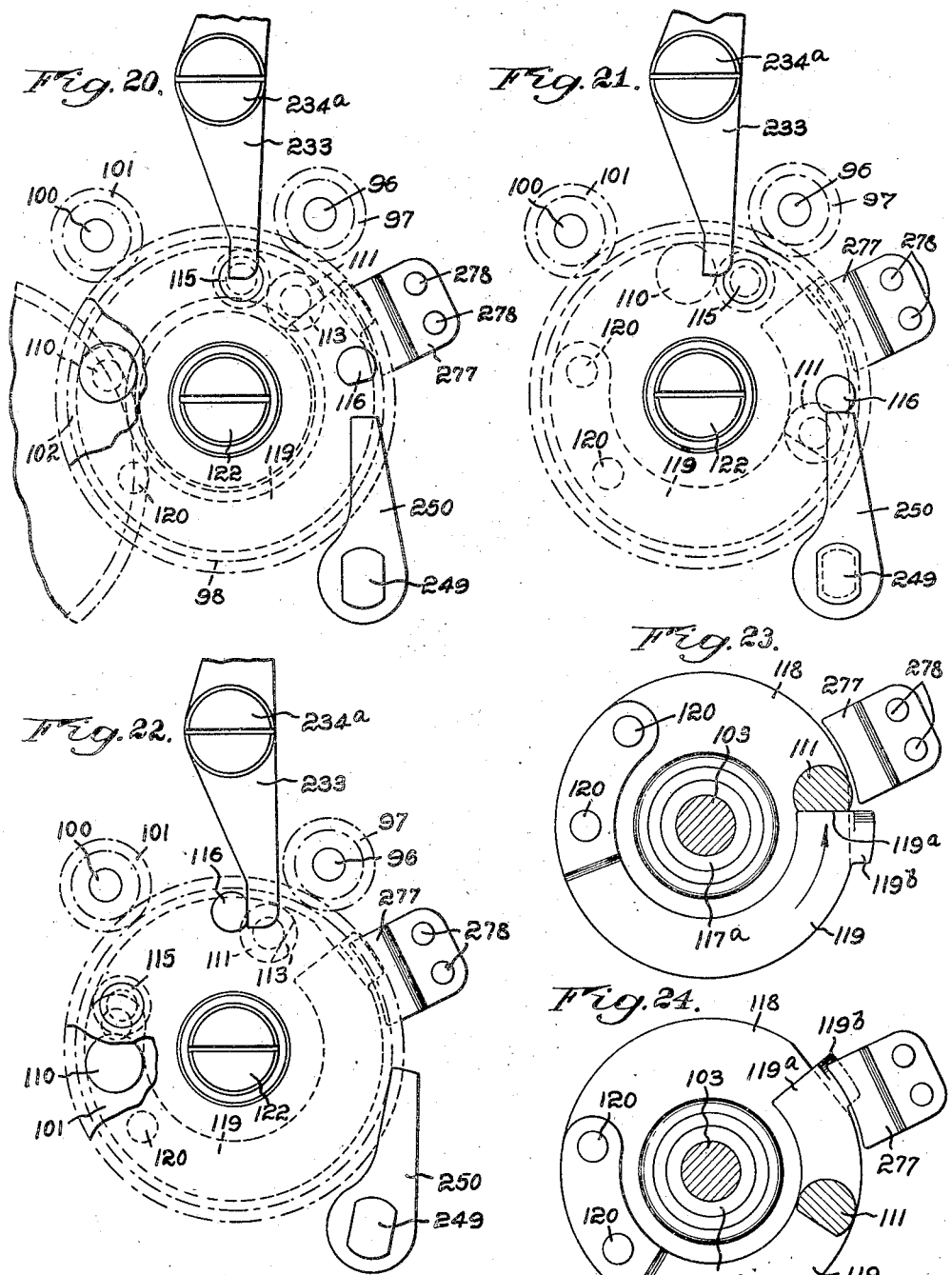

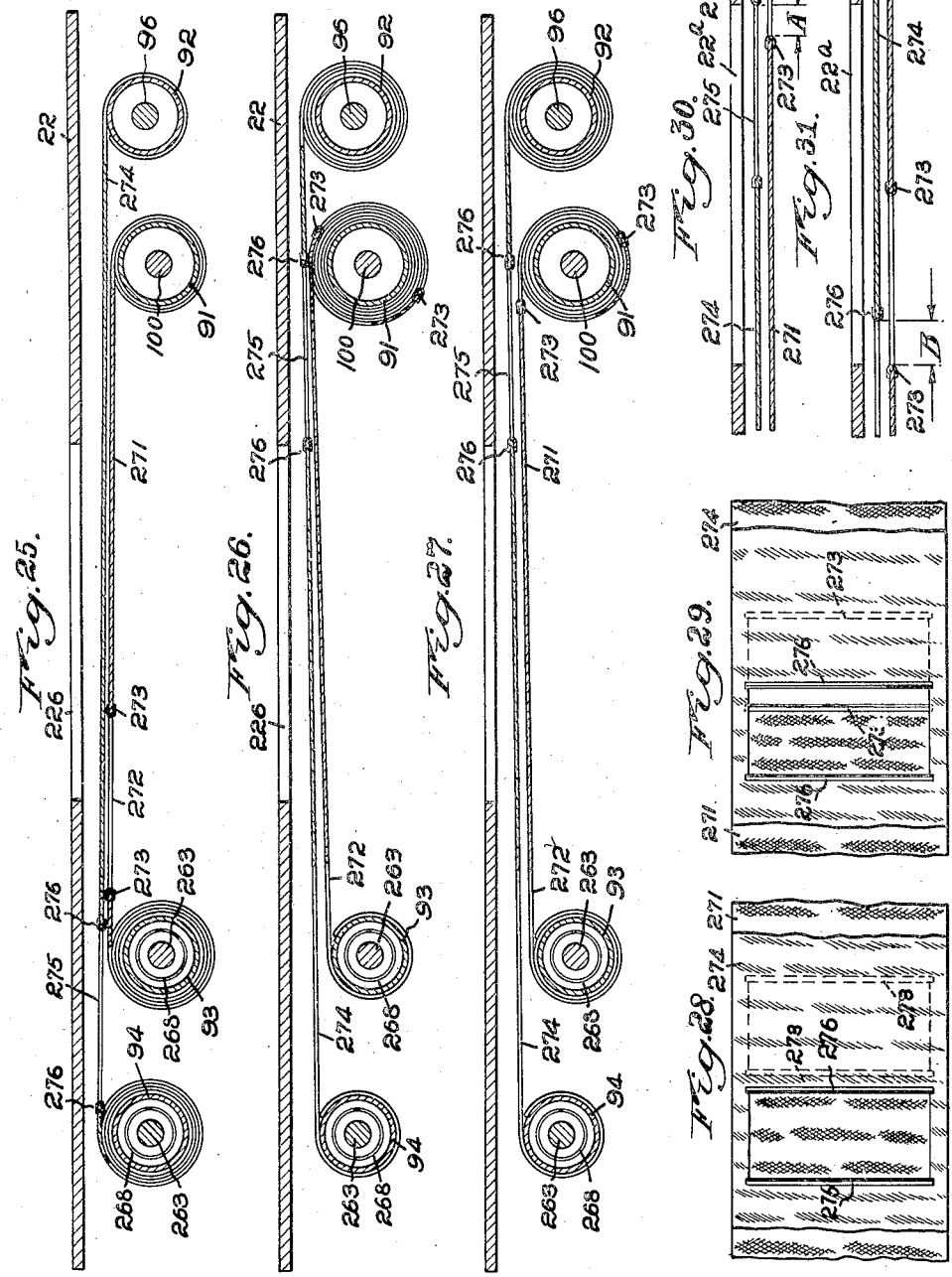

Patented Sept. 10, 1946

2,407,277

UNITED STATES PATENT OFFICE 2,407,277

MOTOR-DRIVEN CURTAIN-SHUTTER AND RELEASE MECHANISM FOR PHOTOGRAPHIC CAMERAS

Edson S. Hineline, Rochester, N. Y., assignor to Graflex, Inc., Rochester, N. Y., a corporation of Delaware Original application October 19, 1943, Serial No. 506,848. Divided and this application March 24, 1944, Serial No. 527,918

21 Claims. (Cl. 95—57)

This application is a division of my co-pending application Ser. No. 506,848, filed October 19, 1943, for Electric-motor-driven combined camera, focal-plane shutter and film-feed, this divisional application being particularly directed to the motor-driven curtain-shutter and release mechanism disclosed in said parent application.

This invention relates to photographic cameras, particularly of the automatic aerial type, but adapted for various uses.

In order that the principle of the invention may be readily understood, I have disclosed a single embodiment thereof in the accompanying drawings, wherein—

Fig. 1 is a front elevation of the camera having the "cone" partly broken away to show clearly the mounting of the lens barrel;

Fig. 2 is an enlarged fragmentary view corresponding to a part of Fig. 1, and also showing the shutter setting knob provided when the camera is equipped with a shutter having a number of different exposure aperture settings;

Fig. 3 is a wiring diagram of the camera, showing a battery as a current supply source and a switch for closing the circuit to operate the camera;

Fig. 4 is a top plan view of the camera with part of the housing in horizontal section so as to show the position of the pressure pad, the idler roll, the film measuring roll, the film spool support and the drive mechanism;

Fig. 5 is a partial vertical section through the camera, taken at the right of the curtain rewind rolls as viewed in Fig. 4 and showing the curtain rewind mechanism and the shutter release solenoid;

Fig. 6 is a detail showing in side elevation the second curtain rewind gear and the second curtain pinion;

Fig. 7 is a vertical section through Fig. 6 on the line 7—7 thereof, showing the curtain latch stud and the second curtain driving stud;

Fig. 8 is a detail in side elevation, showing the first curtain rewind gear and the first curtain pinion;

Fig. 9 is a vertical section through Fig. 8 on the line 9—9 thereof, showing the shutter rewind stud and the second curtain driving stud;

Figure 11:
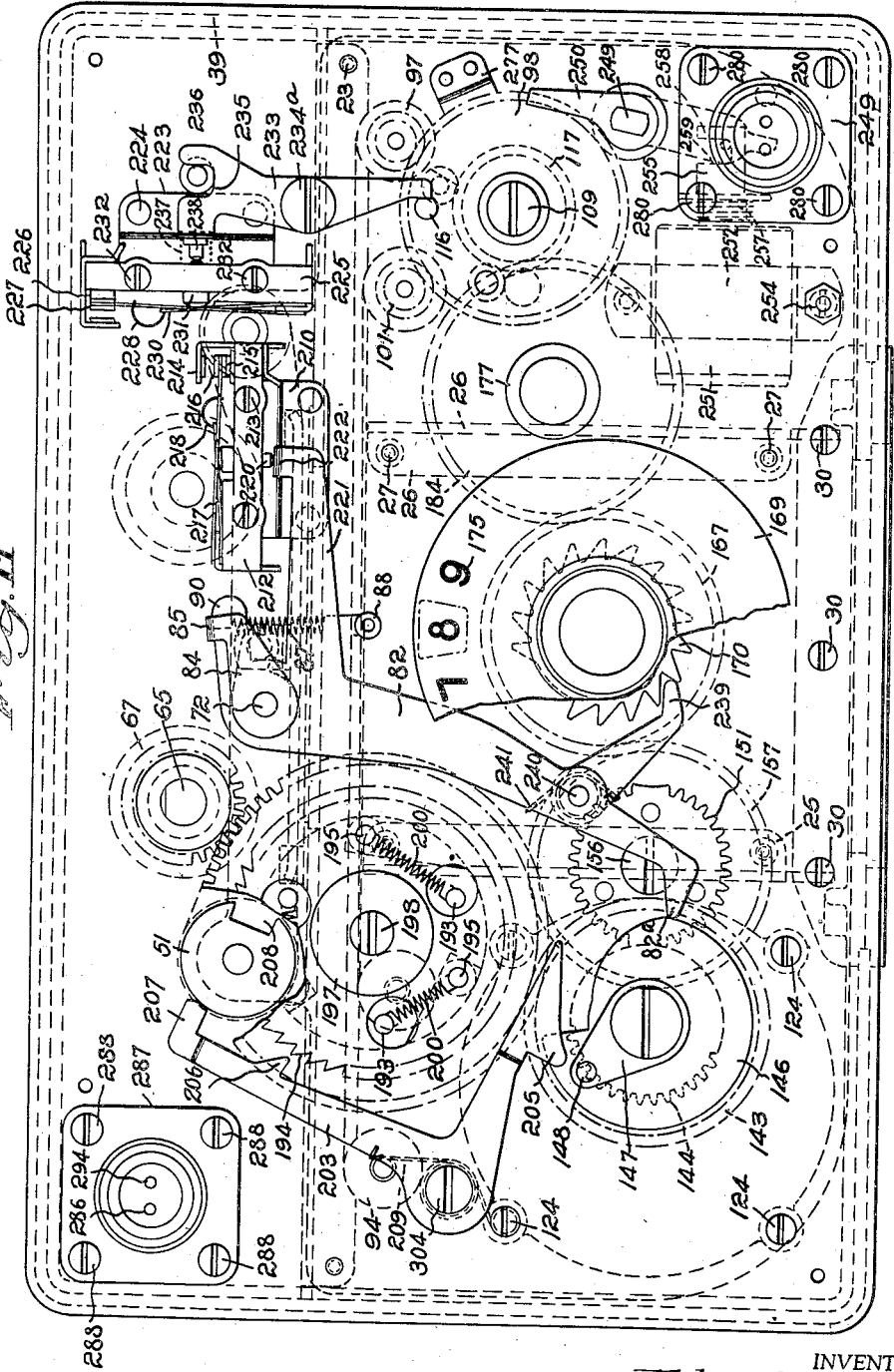

Fig. 10 is a front elevation of the camera with the lens "cone" and the mechanism housing cover removed to show the cycling mechanism, the film feed clutch, the exposure counter, the shutter rewind mechanism, the switches for controlling the cycling mechanism and shutter release, and the receptacles for power supply and remote control, the entire mechanism being shown in its condition when the shutter has been rewound and a new area of film has been fed into position over the exposure opening and the camera is ready for making an exposure;

Fig. 11 is a front elevation similar to Fig. 10 but with a different position of the parts, the circuit having been closed to the shutter release solenoid, the shutter curtain having run all the way down, thus completing a circuit to the motor, and the motor having started to operate, thus lifting the pressure pad and releasing the film measuring mechanism, the film being wound to the next exposure position and the shutter being rewound for the next exposure;

Fig. 12 is a partial horizontal section on an enlarged scale through Fig. 10 on the line 12—12 thereof, showing the motor gear drive and its association with the cycling mechanism or interrupted gears, the idler gear constituting the counter gear and the counter dial;

Fig. 13 is a detail in horizontal section through the film measuring clutch;

Fig. 14 is a detail in side elevation of the interrupted gears;

Fig. 15 is a horizontal section through Fig. 10 on the line 15—15 thereof, showing the shutter rewind mechanism;

Fig. 16 is a fragmentary left-hand end view of the camera viewing Fig. 10, with parts broken away more clearly to show the construction;

Fig. 17 is a horizontal section through the shutter rewind mechanism, showing the shutter rewind driving pawl, the shutter being completely rewound and the driving pawl disengaged from the shutter rewind stud;

Fig. 18 is a side elevation of the parts shown in Fig. 17, certain parts being represented in broken lines to show more clearly the construction of the shutter rewind driving mechanism, represented as in condition for rewinding the shutter, the driving pawl not yet having been released;

Fig. 19 is a view similar to Fig. 18, but representing the driving pawl as released from the driving stud of the first curtain gear;

Fig. 20 is a detail of the shutter rewind mechanism, the shutter being rewound but the rewind pawl not yet released;

Fig. 21 is a view similar to Fig. 20, the rewind pawl having been released and the second curtain release stud engaged by the shutter release member;

Fig. 22 is a view similar to Fig. 21, the shutter having been released and run all the way down;

Fig. 23 is a detail of the shutter winding mechanism with certain of the parts removed to show the construction of the rewind pawl, the rewind stud being shown in section, and the rewind pawl being about to be engaged by the pawl release cam;

Fig. 24 is a view similar to Fig. 23, the rewind pawl having been acted upon by the release cam;

Fig. 25 is a section through the curtain rollers, the curtains and the exposure plate lengthwise the latter, the curtains being shown in the run-down and capped condition;

Fig. 26 is a view similar to Fig. 25, the curtains having been rewound and the exposure slot or aperture thereof not yet established;

Fig. 27 is a view similar to Fig. 25, showing the curtain exposure slot or aperture established and the curtains in condition for making an exposure;

Fig. 28 is a broken-away detail in top plan view of the curtains when in the condition shown in Fig. 25;

Fig. 29 is a similar top plan view of the curtains in the condition shown in Fig. 27;

Fig. 30 is a longitudinal section through the curtains showing the exposure slot or aperture, the curtains having just started to run down or across the exposure opening; and Fig. 31 is a section similar to Fig. 30, the curtains having run down and the exposure slot or aperture being represented as having a greater dimension than the exposure slot or aperture shown in Fig. 30;

This invention relates to a new photographic camera that is adapted to many uses, among them the photographing of flight instruments in an airplane in flight, or instruments used in running various tests, such as manometers, and for almost any purpose requiring a self-contained camera that makes an exposure upon the closing of an electric circuit and then automatically restores itself for a second exposure. The camera is also especially adapted for use as an aerial camera particularly when used for certain classes of work such as photographing the smoke given off by a bomb when it explodes upon hitting the ground. The camera can also be used for regular aerial photographic work. It is perfectly adapted for uses involving setting up a camera in a permanent installation so as to make photographs at predetermined intervals, the electrical circuit being closed by means of a time clock or any other suitable device. Since the camera is so constructed that lenses of almost any focal length can be used, the camera need not be close to the object being photographed. Another use for which this camera is perfectly adapted is for photographing games, such as baseball games, wherein several of such cameras will be mounted and directed at certain spots, such as the various bases, the pitcher's box, or any other desired area, so that one operator can control any one of the cameras at the proper instant by pushing a button and closing an electrical circuit. Such uses will serve to point out the versatility of this camera.

Among the numerous objects of this invention are: to provide a camera of comparatively simple, sturdy construction, thus making it possible to manufacture it in large quantities at a very low cost and one that is foolproof in operation; to provide a camera having a drive motor built within the body of the camera; to provide a camera especially adapted for remote control; to provide a camera having an automatic cycling means that is controlled by the operation of the camera shutter itself, so that after each operation of the shutter the camera is automatically restored to condition for a second exposure; to provide a camera having a self-capping focal-plane shutter of a variable exposure aperture type and having means for controlling the width of the opening of such exposure aperture during the time the curtains travel in a picture-making direction; and to provide a camera having a simple curtain rewind mechanism that can be easily serviced in the field.

This invention is more particularly directed to the shutter mechanism, and to the automatic cycling means driven by an electric motor and controlled by the operation of the shutter itself, so that after each operation of the shutter the camera is automatically reset. Before proceeding to describe these and other important features, I will describe in detail the general structure of the camera body and for that purpose will refer first to Figs. 1, 2, and 4, wherein is shown the preferred form of structure for this purpose.

The camera body, as shown in Figs. 1, 2, 4 and 5, is made up mainly of two parallel spaced plates, one of which is termed the mechanism plate and is indicated in section in Fig. 4 and elsewhere at 20. Parallel therewith and spaced therefrom by nearly the width of the camera is the other or so-called outer plate 21, and supported between said plates 20 and 21, normal thereto, is a central channel member 22, shown in plan in Fig. 4. The said member 22 is attached to mechanism plate 20 by rivets 23, and to the outer plate 21 by screws 24.

Positioned between said plates 20, 21 are partitions 25 and 26, both being indicated in dotted lines in Fig. 4. Both partitions 25, 26 are of channel form, and are attached to the mechanism plate 20 by rivets passing through upturned edges and to the outer plate 21 by screws 28 passing through said upturned edges. Also positioned between the mechanism plate 20 and the outer plate 21 is a "cone" support casting of any suitable shape (indicated in dotted lines at 29 in Figs. 10 and 11 and in solid lines in Fig. 5), which is attached to the mechanism plate 20 by screws, and to the outer plate 21 by screws or in other suitable manner not herein indicated.

Attached to the mechanism plate 20 is a mechanism housing cover 31 by screws 32, 32, as shown in Fig. 1, and the lens "cone" (indicated generally at 33) is attached to the "cone" support casting 29 by screws 34, 34. The said lens "cone" 33 is provided with a bushing 35 into which is threaded the lens barrel 36 of any suitable type and structure.

Enclosing the entire camera is a cover of general rectangular shape made up of two parts 37, 38, completely enclosing the camera parts between the plates 20, 21 (best indicated in Fig. 4). The mechanism plate 20 is provided with a groove 39 into which the cover member 37 is fitted and the lens "cone" casting 29 is provided with a similar groove 40 indicated in dotted lines in Figs. 10 and 11 and in solid lines in Fig. 5. The structure is thus completely light-tight. The said cover consisting of the two cover members 37, 38 is provided with a clamp nut 41 (best shown in Fig. 4) threaded onto a stud 42 attached to the outer plate 21, thus providing means for securely holding the camera cover in the camera body.

In Fig. 4 is represented a film idler roll 43 provided with a shaft 44 free to turn in a bushing 45 mounted in the outer plate 21 and in a bushing 46 mounted on the mechanism plate 20. Also mounted between the mechanism plate 20 and the outer plate 21 is a measuring roll 47 having a shaft 48, one end whereof passes through a bushing 49 in said outer plate 21. The opposite end of the shaft 48 passes through a bushing 50 and the mechanism plate 20. To the outer right-hand or lower end of the shaft 48 (viewing Fig. 4) is attached a measuring cam 51, more fully described subsequently. Fitted over the measuring roll 47 (as shown in Fig. 4) is a rubber cylinder or sleeve 52 so as to provide sufficient friction between said measuring roll 47 and the sensitized film material, accurately to measure off the proper amount of film as it passes around the measuring roll 47.

Attached to the central channel member 22, as best shown in Fig. 4, is an aperture plate 53 by means of screws 54, 54 passing through bushings 55, 55 and threaded into the central channel member 22. Said bushings 55, 55 serve to guide the film through the camera and also properly to position the pressure plate or pad 56.

As best shown in Figs. 4 and 10, to the mechanism plate 20 is attached a film support stud 57, and to the outer plate 21 is attached a second film support stud 58, not mounted directly on the outer plate 21 but carried by a spring member 59 carried by said plate 21. Also attached to the outer plate 21 is a second film spool support stud 60 by means of a spring 61. The springs 59 and 61 are most clearly shown in Fig. 4. They are riveted to the outer plate 21 in any suitable manner.

As shown in Fig. 4, to the mechanism plate 20 is attached a bushing 62 held to said mechanism plate 20 by nut 63 and washer 64. Passing through the bushing 62 is a shaft 65 having the usual film spool driving dog 66. To the opposite end of the shaft 65, as shown in Fig. 10, is a film feed gear 67 provided with a hub 68 and a lock screw 69. The said film feed gear and its function will be more fully referred to subsequently.

Referring to Fig. 4, the pressure plate or pad 56 is provided with a hinge member 70 attached thereto by rivets 71, 71. Passing through the mechanism plate 20 and the outer plate 21 is a shaft 72, and mounted thereon is a hub 73, shown in Fig. 4 as locked to the shaft 72 by a lock screw 74. Attached to the shaft 72, as to the hub 73 thereof, in any well known manner, is an arm 75 provided with a pin 76 engaging a hole in the hinge member 70. On the opposite end of the shaft 72 adjacent to the mechanism plate 20 is a second hub 77 having a lock screw 78. The hub 77 is also provided with an arm 79 and a pin 80, the latter engaging a second hole in the hinge member 70.

Fitted to the right-hand end of the shaft 72, viewing Fig. 4, is a hub 81 having attached thereto a bell crank 82 with a lateral extension 82a at its lower end, shown most clearly in Fig. 10. Free to turn on the shaft 72 is a washer 83 separating the pressure pad operating arm 84 that is riveted to the shaft 72. As indicated in Fig. 10, said pressure pad operating arm 84 is provided with an L-shaped end 85 provided with a hole into which is hooked the spring 87, the opposite end whereof is anchored to the spring support rod 88, as shown most clearly in Figs. 10 and 11. Inasmuch as the pressure pad operating arm 84 is securely attached to the shaft 72, when the pressure pad operating arm 84 is turned in a contraclockwise direction, viewing Figs. 10 and 11, the pressure plate or pad 56 will be caused to be lifted from the sensitized material 89, and when released the shaft 72 will be caused to turn in a clockwise direction, thus applying pressure to the sensitized material 89 through the tension of spring 87. The said bell crank 82 is provided with a second arm 90 that engages the L-shaped or turned-over end 85 of the pressure pad operating arm 84. Thus any movement of the bell crank 82 in a contraclockwise direction will cause the shaft 72 also to be turned in a contraclockwise direction.

The structure thus far referred to is that pertaining to or constituting the general structure of the camera, excepting that structure relating to the pressure plate or pad mechanism. My invention is not limited to a camera of the specific structure thus far described, which has been set forth merely as one embodiment of means for supporting those portions of the photographic mechanism to which my invention more particularly applies.

*The shutter mechanism.*—I will next describe the shutter mechanism, which is motor driven by an electric motor within the camera body, and which shutter is preferably of the two-curtain focal-plane shutter type providing, if desired, a variable aperture, and which shutter is self-capping while being wound. In cooperation with the shutter there is provided automatic cycling means controlled by the operation of the shutter itself, so that after each operation the camera is ready for the next operation.

I will describe without limiting myself thereto the specific construction provided for this purpose, and in so doing I will refer particularly to Fig. 4 and Figs. 5 to 10 and 16.

The camera is provided with a first curtain take-up roller 91, shown in solid lines in Fig. 5 and in dotted lines in Fig. 4, and with a second-curtain take-up roller 92 similarly shown in said figures. Each of said curtains is provided with the usual tension roller, the first curtain tension roller being indicated at 93, in dotted lines in Fig. 4, and the second curtain tension roller 94 in Figs. 4 and 16. They are also shown in the subsequently referred to views Figs. 25 to 28.

In Fig. 5, indicating certain of the parts in vertical section and showing many of the parts that are fitted to the mechanism plate 20, there is shown therein a bushing 95 through which passes the shaft 96 of the second curtain take-up roller 92, to which shaft is attached in any suitable manner a pinion 97 meshing with the second curtain rewind gear 98. Also fitted to the said mechanism plate 20 is another bushing 99 through which passes the shaft 100 of the said first curtain take-up roller 91, and to the left-hand end of said shaft 100 is attached the first curtain pinion 101 meshing with the first curtain rewind gear 102, which with the second curtain rewind gear 98 are carried on a stud shaft or stud 103, best indicated in Figs. 5, 15 and 17. The said shaft or stud 103 is provided with a separating collar 104 and has a reduced diameter 103a and a threaded end portion 105. The said shaft or stud passes through the said mechanism plate 20 and is securely held thereto by nut 106 and lock washer 107.

The second curtain rewind gear 98 and the first curtain rewind gear 102, as most clearly shown in Figs. 5, 15 and 17, are mounted on said shaft 103. The said first curtain rewind gear 102 is provided with a hub 108, a bushing 109, a second curtain drive stud 110 and a first curtain drive stud 111. The said second curtain drive stud 110 is shown in Fig. 9 as riveted to the said first curtain rewind gear 102. The said first curtain drive stud 111 has a neck portion 112 passing through the first curtain rewind gear 102 and through a collar 113, and is riveted as shown in said Fig. 9. The said collar 113 forms driving means for driving the said second curtain rewind gear 98, which is also provided with a hub 114 and a bushing 114a. As shown most clearly in Fig. 7, a second curtain rewind gear driving stud 115 is attached to the second curtain rewind gear 98 by riveting or otherwise, and in the same manner shutter release stud 116 is also attached. Also fitted to the said shaft 103 is a main shutter gear 117 having a bushing 117a and attached to said latter gear is a driving plate 118, shown upon a larger scale in Figs. 17, 18 and 19, and to which is attached, as shown in Fig. 15, the shutter rewind clutch member 119 by means of rivets 120. The said second curtain rewind gear 98, the first curtain rewind gear 102 and the main shutter rewind gear 117 are, as stated, all carried on the shaft 103, being held thereto by a large head screw 122.

I will now describe in detail the electric motor drive for the shutter, and will refer to Figs. 10, 11 and 12, and more particularly to Fig. 16.

I preferably provide an electric motor of a conventional type procurable on the open market, but having a speed reducing transmission built thereon. Such a motor is diagrammatically indicated at 123 as attached to the inner face of the mechanism plate 20 by screws 124, 124. As shown in Fig. 16, a pinion 125 is attached directly to the motor armature shaft and meshes with an intermediate gear 126 carried on a shaft 127, running in bushings 128 in one wall of the gear housing, and in a bushing 129 in the gear cover plate 130, which is itself attached to the motor housing by shoulder screws 130a, 130a. Also mounted on the said shaft 127 is a pinion 131 meshing with a second intermediate gear 132 carried on a shaft 133 which runs in a bushing 134 fitted to one wall of the gear housing and in a second bushing 135 fitted to the gear housing cover plate 130. Also mounted on the shaft 133 is a pinion 136 that meshes with a drive gear 137 attached to the main drive shaft 138, being fitted into a bushing 139 and passing through the mechanism plate 20 and securely attached to the gear housing cover plate 130.

Still referring particularly to Figs. 10, 11, 12 and 16, the shaft 138 is provided with a reduced diameter 140, to which is fitted a hub 141 keyed thereto by pin 142. Attached to the hub 141 is a film feed drive gear 143 and an interrupted gear 144, also shown in Fig. 14. The said gears 143 and 144 are attached to the hub member 141 by through rivets 145, 145, and fitted to said hub 141 is a cam plate 146, while fitted over the reduced diameter 140 of the shaft 138 is a crank member 147 provided with a pin 148. The crank member 147, cam plate 146 and hub member 141 are all securely attached to the shaft 138 by a large head screw 149, said hub member 141 being keyed to the shaft 138, so that its position with respect to that shaft is fixed.

As shown most particularly in Figs. 10, 11, 12, the cam plate 146 and the crank member 147 can be adjusted circumferentially with respect to the shaft 138 by loosening the screw 149, and when the proper position is found, they are securely clamped in place by said screw 149. The said film feed drive gear 143 meshes with the film feed clutch gear 150 (Fig. 13), and the interrupted gear 144 co-acts with a second interrupted gear 151, best shown in Fig. 14, so as to provide an interrupted motion to the shutter rewind mechanism.

Still referring to Fig. 12, fitted to the mechanism plate 20 and securely anchored thereto, is a stud 152 having an enlarged diameter or shoulder 153, a reduced diameter 154, a washer 155 and a large head screw 156. The said interrupted gear 151 is fitted to the reduced diameter 154 of said stud 152, and is free to rotate thereon. Attached to the interrupted gear 151 is a drive gear 157 by means of rivets 158, and said drive gear 157 is caused to be rotated intermittently through the gears 151 and 144, the said gear 144 being driven by the said electric motor 123.

Referring particularly to Figs. 10, 11 and 12, to the mechanism plate 20 is fitted a stud 159 having a reduced diameter 160 passing through said mechanism plate 20 and locked thereto by washer 161 and nut 162 threaded to the threaded projection 159a of the said stud 159, which is provided with an enlarged diameter forming a collar 163. The said stud 159 extends outward sufficiently far to provide a bearing for a dial for counting the number of exposures upon the film, which dial will be described in detail subsequently.

In Fig. 12 is represented at 164 an extension of the stud 159. Fitted over said stud 159 at its inner end is a washer 165, and free to rotate on said stud 159 is a bushing 166 which has a press fit in an idler gear 167. Upon the extension 164 of the stud 159 is fitted a knob 168, shown in Figs. 10, 11 and 12, to which is attached a counter dial 169 of saucer-like formation, and a ratchet wheel 170, both securely held to the knob 168, as best shown in Fig. 12. The knob 168 is provided with a shoulder 171 and is held on the extension 164 of the stud 159 by means of the mechanism cover 31, which, as shown, has a suitable hole through which passes the reduced diameter of said knob 168. Fitted upon the said knob 168, as best shown in Fig. 12, is a coiled spring 172 having an outwardly extending end 173 engaged by a turned-in slotted portion 174 of the said cover 31. The said counter-dial 169 is provided with a series of numbers 175, shown in Figs. 10 and 11, corresponding to the number of exposures that has been made. The coil spring 172 acts as a one-way clutch on the said counter-dial knob 168. The purpose of this construction will be more fully set forth in the description of the operation of the camera.

Still referring to Figs. 10, 11 and 12, and also and particularly to Fig. 15, there is fitted to the mechanism plate 20 a stud 176 having a head 177, a reduced diameter portion 178 and a threaded end 179, the said stud being fitted to the said mechanism plate 20 by such reduced diameter portion 178 which is itself fitted into a suitable hole provided therefor and is securely locked by a washer 180 and a nut 181. Fitted to the stud 176 between the head 177 and the washer 182 is a bushing 183 which is free to turn on the stud 176 but has a press fit in a second idler gear 184 meshing with the main shutter rewind gear 117 for rewinding the shutter curtains.

Referring now to Figs. 10, 11, 13 and 16, and particularly to Fig. 13, wherein the structure to be described is shown in section, there is riveted to the mechanism plate 20 a stud 185 having an enlarged shoulder 186 and a reduced diameter 187 passing through a suitable hole in the mechanism plate 20 and riveted thereto. Fitted over the stud 185 is a bushing 188 over which itself is fitted a film clutch drive gear 189 provided with a hub 190, to which hub is fitted a spacing plate 191 and an overrunning interclutch member 192, the said clutch member 192, the spacing plate 191 and the film clutch gear 189 being riveted together by shoulder rivets 193, 193 passing through suitable holes provided in the parts.

Referring to Fig. 13, running on the outer surface of the interclutch member 192 is the film feed clutch gear 159 previously referred to, and that meshes with the previously described film feed drive gear 143. Also fitted to the hub 190 is a ratchet plate 194 provided with studs 195, 195, passing through the ratchet plate 194 and engaging clutch rollers, one of which is shown at 196 in Fig. 13, the said ratchet plate 194 being provided with clearance holes 194a to allow free movement of the shoulder rivets 193, 193. This entire assembly is held to the stud 185 by a retaining plate 197 and a lock screw 198.

The interclutch member 192 is provided with usual notches 199, shown in dotted lines in Figs. 10 and 11. The rollers 196 are fitted in the said notches 199. Connecting the shoulder rivets 193, 195 are springs 200. Inasmuch as the shoulder rivet 193 is permanently attached to the interclutch member 192 and the shoulder rivet 195 is securely attached to the ratchet plate 194, the said springs 200 will cause the said ratchet plate 194 to be turned in a clockwise direction, thereby causing the rollers 196 to engage the bore of the film feed clutch gear 159. If such latter gear 159 is caused to be turned in a clockwise direction, the rollers 196 will be caused to move in a clockwise direction, thus wedging between the interclutch member 192 and the bore of the film feed clutch gear 159, thereby causing the said interclutch member 192 to be also driven in a clockwise direction. If, however, the teeth of the ratchet gear or plate 194 are engaged and prevented from moving, the rollers 196 will be prevented from moving in a clockwise direction, thus releasing them from engagement with the bore of the said film feed clutch gear 159. When the said ratchet wheel or plate 194 is released, the springs 200 will again cause the rollers 196 to be moved in a clockwise direction, and the interclutch member 192 will be driven by the said rollers 196 and the film feed clutch gear 159.

The full purpose of the structure just described in detail will be fully set forth in connection with the explanation of the complete operation of the camera.

*The film feed mechanism.*—I will next describe the film feed mechanism, not herein claimed, following which I will set forth in detail the electrical mechanism by means of which the film is fed for the successive exposures and by which the shutter is operated, and the means by which the automatic cycling is controlled by the operation of the shutter itself. I will first refer to Figs. 4, 10 and 11.

On the mechanism plate 20 is mounted a stud 201 to which is attached a bushing 202 having riveted thereto a film feed clutch bell crank 203 held to the stud 201 by shoulder screw 204 and provided with a cam-shaped formation 205 for engaging the pin 149 previously referred to as provided on the crank member 147. The purpose of the pin 149 will be more fully set forth subsequently. The upper arm of the bell crank 203 is provided with a dog 206 to engage the teeth of the ratchet wheel 194, and on the extreme upper end of the bell crank 203 is a finger-like extension 207 for engaging a notch 208 of the film measuring cam 51, previously referred to, such notch being best shown in Fig. 11. About the stud 201 of the hub or bushing 202 is a spring 209, one end whereof is hooked around one of the motor screws 124 and the opposite end whereof is hooked to the bell crank 203, causing the latter to be turned in a clockwise direction.

When the finger 207 of the bell crank 203 is held out of the notch 208 of the said film measuring cam 51, the ratchet plate 194 will be allowed to rotate, thus causing the film clutch drive gear 189 to be driven through the clutch members previously referred to.

Since the said clutch drive gear 189 is in mesh with the film feed gear 67, as shown in Fig. 10, the film spool will be caused to rotate in a contraclockwise direction, winding the film until the clutch drive gear 189 is again stopped.

As the film moves over the measuring roll 47, the said measuring roll will make one revolution, as will also the film measuring cam 51, and the notch 208 will be engaged by the finger 207, thus permitting the bell crank 203 to rotate in a clockwise direction under the influence of the spring 209, and the dog 206 will engage the teeth of the ratchet wheel 194, disengaging the clutch and the clutch drive gear 189, and the gear 67 will be stopped from further rotation. The measuring roll 47 and its rubber sleeve 52 are of such diameter as to cause just sufficient film to be fed when making one revolution to provide a new area of sensitized material for the next exposure.

*The electric switches.*—I will now particularly refer to the electrical switches and cooperating parts, by which not only the feed of the film is controlled, but also the operation of the shutter, and will first refer particularly to Figs. 10 and 11.

To the mechanism plate 20 is attached a switch support plate 210 by means of rivets 211, 211 and to said switch support plate 210 is attached a switch 212, being a standard switch of any one of several different acceptable types. Herein for the purpose I have illustrated a switch known in the trade as the "Acro" switch, which is attached to the said switch support plate by screws 213, 213. The said switch 212 is provided with contacts 214, 215 and 216. The contact 216 is carried on a spring 217 actuated by a semicircular spring 218 through a short flat spring 219 and a pin 220. When said pin 220 is moved in an upward direction viewing Figs. 10 and 11, the position of the semicircular spring 218 is changed, thus altering the center of effort, causing the spring 217 to be moved downward, thus closing contacts 216 and 215. When the pin 220 is released, it will be moved in a downward direction by the spring 219, thus again changing the center of effort of spring 218 and causing the spring 217 to be moved in an upward direction, thus causing the meeting of contacts 216 and 214.

The said switch 212 is actuated by the bell crank 82, previously described and shown most clearly in Fig. 10. The said bell crank 82 is provided for the purpose with an arm 221 having a turned-over end 222 for co-acting with the pin 220. The said bell crank 82 is acted upon by the cam plate 146, previously described, through the finger 82a of the bell crank 82 when the film feed drive gear 143 is rotated, as will be subsequently more fully described.

Still referring to Figs. 10 and 11, attached to the said mechanism plate 20 is a second switch support plate 223 by means of rivets 224 and attached to the said support plate is a switch 225 of structure preferably similar to the switch 212 excepting that it is provided with contacts 226 and 227 only. The said switch 225 is also provided with a similar semicircular spring 228, a contact spring 229, a short actuating spring 230 and an operating pin 231. The said switch 225 is attached to the switch support plate 223 by screws 232, 232.

*Switch operating mechanism.*—I will next describe the switch operating mechanism for the electrical circuit controlling the shutter and film feeding means, and for that purpose I will refer to Figs. 10 and 11 and also to Fig. 5.

Mounted upon the said mechanism plate 20 is a switch operating lever 233 pivoted to a stud 234 on said plate, said operating lever being securely held upon the stud 234, so as freely to rotate thereon, by means of a large head screw 234a, and said operating lever is provided with a notch 235 to limit its motion, said notch co-acting with a pin 236 on the mechanism plate 20. The said switch operating lever is moved in a clockwise direction by a spring 237 fitted over a stud 238 attached to the said operating lever and pressing against the switch housing of the switch 225.

The said switch operating lever 233 serves both as a switch operating lever and also as a shutter run-down stop lever, it being engaged by the pin or stud 116 on the second curtain rewind gear 98 when the shutter is released and runs all the way down, thus limiting the motion of the said second curtain rewind gear 98. At the same time it causes the contacts 226 and 227 to be closed, thus completing the circuit to the motor in a manner herein subsequently described.

Referring particularly to Fig. 11, there is attached to the lower end of the bell crank 82 a short L-shaped arm 239 by means of a shoulder rivet 240, the said L-shaped arm being caused to be rotated in a contraclockwise direction under the influence of a spring 241 fitted around said shoulder rivet 240, one end of said spring being connected to the bell crank 82 and the opposite end to said L-shaped arm 239. When the bell crank 82 is caused to be moved to the right or contraclockwise viewing Fig. 11 by the cam 146, the teeth of ratchet wheel 170 will be engaged, thus causing the exposure counter-dial 169 to be rotated in a contraclockwise direction, said dial being prevented from turning clockwise by the clutch spring 172.

Still referring to Figs. 5, 10 and 11, there is attached to the mechanism plate 20 a bushing 243 through which passes a shaft 244 having a reduced diameter indicated in dotted lines at 245, and to which is there fitted a hub 246 having an attached crank arm 247 securely attached to hub 246 by shoulder screw 248 which serves to attach both parts to the shaft 244. The opposite end of the shaft 244 is provided with an enlarged diameter 249 to which is securely attached a shutter release lever 250 which is provided to engage the pin or stud 116 when the shutter is fully wound.

Still referring to Figs. 10 and 11, attached to the mechanism plate 20 is a magnetic solenoid 251 (indicated also in the diagram Fig. 3) by means of a strap 252, bolts 253 and nuts 254, said solenoid having the usual plunger or armature shown in dotted lines in said figures and indicated at 255, and which is provided with an enlarged collar 256 between which and the solenoid housing is a spring 257 causing the armature to move to the right viewing Figs. 10 and 11, the right-hand end of said armature being provided with a hook member 258 having a slot 259. Securely attached to the said crank arm 247 is a pin 260 which is acted upon by the hook member 258 when the solenoid 251 is energized. When the circuit is broken, the spring 257 causes the solenoid plunger or armature to be moved a sufficient distance to the right, viewing Figs. 10 and 11 co-acting with the collar 256 to that end. A stop pin 261 is provided on the mechanism plate 20 and there is also provided a cooperating protruding lip 262 on the said crank arm 247.

*The shutter curtain rollers.*—I have previously described the structure of the two-curtain shutter excepting as to certain details of the tension rollers and take-up rollers thereof, which I will now set forth.

Inasmuch as the spring take-up roller 93 for the first curtain and the spring take-up roller 94 for the second curtain are of identical construction, I will for brevity here describe or refer only to tension roller 94, and will refer particularly to Fig. 16, but it is to be understood that both said rollers have the same structure.

Fitted into a hole provided therefor in the mechanism plate 20 is a shaft 263 extending through said tension roller 94 and through the outer plate 21, and securely locked thereto by means of a washer 264 and a nut 265, as shown in Fig. 4. Said tension rollers 93 and 94 are provided with bushings 266 on either end. Each such bushing on the right-hand end, viewing Fig. 16, is provided with a hole through which passes the end 267 of the tension spring 268, thus locking one end of said spring to the proper tension roller. The opposite end of said tension spring 268 is anchored to the shaft 263, but is not herein shown. Between each bushing 266 and the mechanism plate 20 is a thrust washer 269, and between such bushing 266 on the opposite end of said curtain tension roller and the outer plate 21 is a second thrust washer 270, shown in Fig. 4.

*The two-curtain shutter movements.*—I will now describe the shutter, and for that purpose I will refer mainly to the vertical sectional view (Fig. 5), to the sectional views (Figs. 17, 18 and 19) showing the shutter rewinding mechanism, to Figs. 20 to 24 showing different positions of such rewinding mechanism, and to Figs. 25 to 31 showing the two curtains in longitudinal section and in plan.

Attached to the first curtain tension roller 93 and partly wound thereon and attached also to the first curtain take-up roller 91, is the first curtain 271 provided with an exposure slot or opening 272 and having the usual curtain struts 273, 273. Attached to the second curtain tension roller 94 and partly wound thereon is the second curtain 274 which at its opposite end is attached to the second curtain take-up roller 92. The said second curtain 274 is provided with an exposure slot or opening 275 having the usual struts 276, 276. The first curtain take-up roller 91 is connected as shown in Figs. 8 and 9 to the first curtain rewind gear 102 by means of pinion 101 and shaft 100. The second curtain take-up roller 92 is, as shown in Figs. 6 and 7, connected to the second curtain rewind gear 98 by means of the pinion 97 on the shaft 96. When said second and first curtain rewind gears 98 and 102 are caused to be turned in a contraclockwise direction, the said take-up curtain rollers 91 and 92 will be caused to turn in a clockwise direction, thus winding said first and second curtains 271, 274 upon their respective take-up rollers.

The main shutter rewind gear 117 (Figs. 17, 18 and 19) is caused to be turned in a contraclockwise direction by means to be subsequently more fully referred to, carrying with it the driving plate 118 and the shutter rewind clutch member 119. The end of the shutter rewind clutch 119a, Fig. 18, will engage the stud 111 of the first curtain rewind gear 102, causing it to be turned in a contraclockwise direction, causing pinion 101 to be turned in a clockwise direction, and causing the first curtain take-up roller 91 also to be turned in a clockwise direction, thus winding said first curtain 271 on its take-up roller 91. The second curtain rewind gear 98 will also be driven in a contraclockwise direction by reason of the collar 113 engaging the stud 115 of the second curtain rewind gear 98 after said first curtain has traveled a distance sufficient to cap the second curtain 274, as shown in Fig. 25. The pinion 97 will now be turned in a clockwise direction, thus winding said second curtain 274 on its take-up roller 92, and when said second curtain reaches the position shown in Fig. 26, the first curtain rewind gear 102 is caused to be disengaged from the stud 111 by reason of the cam plate 277 attached to the mechanism plate 20 by rivets 278, 278, as shown in Fig. 17.

As the main shutter rewind gear 117 continues to turn in a clockwise direction, the curved end 119b of the shutter rewind clutch member 119 will ride along the under face of the cam 277, thus disengaging the end 119a of the said clutch member 119 from the stud 111, as shown in Fig. 19, but just previous to such disengagement the stud or pin 116 has moved past the end of the shutter release lever 250 (best shown in Figs. 10 and 11), thus preventing the second curtain rewind gear 98 from turning in a clockwise direction when the stud 111 becomes disengaged from the shutter rewind clutch member 119, as previously described, so that the first curtain rewind gear 102 will be permitted to turn in a clockwise direction until the stud 110 engages the stud 115 of the second curtain rewind gear 98, thus preventing further movement of said first curtain rewind gear 102 in a clockwise direction, as indicated in Fig. 19. The two curtains will now be in the position shown in Fig. 27 with the exposure slot or opening A formed between said two curtains.

It will be evident from the drawings and from the foregoing description that the curtain aperture is determined through the manipulation of the second curtain. The curtain slot is established, as shown in Fig. 27, at the completion of the rewinding of the shutter, and the position of the struts 273, 276 is under control; that is, their rate of movement is in control with respect to each other throughout the exposure regardless of the initial separation of struts 273, 276. Both curtains continue to travel across the exposure opening of the camera and are stopped together after they have made a complete exposure and are not capped until the commencement of the rewinding cycle. This is because the second curtain is caused to move first, and then the first curtain is picked up. After the apertures have been capped, the curtains travel across the exposure opening in the capped condition, and when the shutter reaches a point just before being fully rewound, the first curtain is released and allowed to run in a direction toward an exposure opening, and thereby establishes the curtain aperture. Both curtains always travel exactly the same distance in each half cycle; that is, both curtains travel together when released for making an exposure, throughout that exposure, and are stopped together.

The two-curtain shutter herein disclosed is made up of two curtains, each having an aperture that together form an exposure aperture when the shutter curtains are traveling in one direction, and said apertures are so spaced when the curtain is rewound as to constitute self-capping means. At the completion of the rewinding cycle of the shutter, both curtains are wound up together in a light-tight condition until both the curtain apertures have traveled past the exposure opening of the camera in rewinding and then, as stated, just before the rewinding is completed, the first curtain is released and allowed to run back a very short predetermined distance, thus forming the exposure aperture by having the two curtain apertures in alignment.

This has never been accomplished in the prior art, which at the most discloses a two-curtain shutter wherein, when making an exposure, the curtain aperture is established when rewinding the curtain by causing the second curtain to stop and allowing the first curtain to continue winding until a slot is established, and it is held in that position until both curtains are released, whereupon they start to travel across the exposure opening, and when the second curtain strut has passed the camera exposure opening, that curtain is stopped but the first curtain continues to travel past the exposure opening of the camera and past the strut of the second curtain, thus capping the shutter. Such a construction provides no control of the curtain aperture except for a very narrow slot, and such construction would be ineffective for wider slots or for a full aperture slot such as used for slow exposures.

The shutter disclosed herein is capable of operating at very high speeds, particularly because when the shutter runs down, nothing rotates except the pinions 97 and 101 and their drive gears 98 and 102, as such gears are wholly disconnected from the rewind gear 117 when making an exposure.

A résumé of the two-curtain shutter movements is as follows, reference being made to Figs. 5, 10, 11 and 17 to 22. The first curtain 271 has an aperture 272, a rewinding roller shaft 100 having a pinion 101 meshing with rewinding gear 102. The second curtain 274 has an aperture 275, a rewind shaft 96 carrying a second curtain rewind roller 92 and has a pinion 97 meshing with the second curtain rewind gear 98. In Fig. 5 the shutter is in a fully rewound condition. The gear 98 is prevented from turning in a clockwise direction by shutter release lever 250 and pin 116, and rewind gear 102 is prevented from turning in a clockwise direction because of pin 115 of gear 98 engaging pin 110 of gear 102. Since the curtain rollers are driven by the gears just recited, they too will be held from turning. To make an exposure, shutter release lever 250 is disengaged from pin 112 of second curtain rewind gear 98, allowing it to turn. This will also allow first curtain rewind gear 102 to turn, both gears turning in a clockwise direction. First curtain gear 102 cannot turn faster than second curtain gear 98 because pin 110 of gear 102 cannot pass pin 115 of gear 98, and since first curtain 271 is provided with a slightly higher spring tension than second curtain 274, pin 110 will be held in contact with pin 115 throughout the exposure travel. When the curtain is fully run down, second curtain gear 98 will be stopped through pin 116 engaging switch lever 233 (see Fig. 11)

and, of course, first curtain will also be stopped because of pins 110, 115. In rewinding, main rewind gear 117 is caused to be rotated in a contraclockwise direction. First curtain rewind gear 102 will be caused to be rotated in a contraclockwise direction through clutch member 119 engaging pin 111 of gear 102. Gear 102 will continue to rotate carrying with it pin 113 and, when pin 113 engages pin 115 of the second curtain rewind gear 98, it too will be caused to turn, but while gear 102 was turning through that part of a revolution represented by the spacing of pins 110 and 113, the first curtain will have been moved sufficiently far to cap the exposure opening. Both gears 102 and 98 will continue to rotate until pin 116 has been engaged by shutter release lever 250 and at substantially the same time clutch member 119 will be disengaged from pin 111 of gear 102, thus preventing any forward movement of gear 102 and gear 98 in a contraclockwise direction. Gear 102 will now be caused to turn in a clockwise direction under the influence of the first curtain tension roller and will continue to rotate in a clockwise direction until stopped by pin 110 of gear 102 engaging pin 115 of gear 98. This movement is sufficient to allow the first curtain aperture to travel far enough over the second curtain aperture to establish the exposure aperture in the pair of curtains. The shutter is now ready for a second exposure. Both curtain rewind gears 98 and 102 and both curtain rewind rollers 91 and 92 always turn the same amount when the shutter is rewound, but the first curtain rewind roller is allowed to make an initial rotation in a curtain-run-down direction just after it has been fully rewound.

In Fig. 20 is shown the position of the several parts just prior to the act of releasing the first curtain rewind gear 102 from the shutter rewind clutch member 119, and it will be noted that the stud or pin 116 has traveled some little distance beyond the shutter release lever 250. The driving stud 111 has not at this time been released, but said stud 111 is at the point when any further movement in a contraclockwise direction of the main shutter rewind gear 117 will cause said stud 111 to be released, thereby allowing both curtain rewind gears 98 and 102 to turn in a clockwise direction. However, as soon as the stud or pin 116 of the second curtain rewind gear 98 reaches the shutter release lever 250, said second curtain rewind gear 98 will be held from further movement, but the first curtain rewind gear 102 will be allowed to turn in a clockwise direction until the stud 110 of the first curtain rewind gear 102 is stopped by the stud 115 of the second curtain rewind gear 98. The mechanism will now be in the position shown in Fig. 21, and the curtain exposure slot or opening A will be established as shown in Fig. 27.

When the shutter release lever 250 is operated by the solenoid magnet 251, previously referred to, the pin or stud 116 will be disengaged by the shutter release lever 250, allowing both said curtain rewind gears 98 and 102 to turn in a clockwise direction. The stud 110 will remain in contact with the stud 115 until the stud or pin 116 is stopped from further movement by the switch operating lever 233, shown in Fig. 22 and elsewhere.

Then the main shutter rewind gear 117 is again caused to be turned in a contraclockwise direction, carrying with it the driving plate 118 of such shutter rewind member 119, the latter will engage the stud 111 in the manner previously described, thus winding the first curtain 271 into the position shown in Fig. 25, in which position said first curtain caps the exposure slot or aperture 275 of the second curtain 274, which reciprocally caps the exposure slot or aperture 272 of the first curtain 271. The collar 113 will then engage the stud 115, causing the second curtain 274 to be driven until the main shutter rewind gear 117 makes a complete revolution, and before the end of such complete revolution the shutter rewind member 119 will be disengaged from the stud 111 through the action of the cam plate 277 engaging said shutter rewind member 119.

In Fig. 23 is shown the relation of the said shutter rewind member 119 just before its action upon the cam plate 277, and in Fig. 24 the shutter rewind member 119 is shown as having been acted upon by the cam plate 277, so that the stud 111 has been disengaged and the first curtain rewind gear 102 has turned in a clockwise direction a distance sufficient to establish the curtain exposure slot or opening.

It will be noted that the first curtain take-up roller 91 is of a somewhat larger diameter than the second curtain take-up roller 92. This is for the purpose of allowing the first curtain 271 to move at a slightly greater rate than the second curtain 274, so as to allow the aperture A, as indicated at Fig. 30, to increase as the two curtains travel across the exposure opening 22b of the camera.

In Fig. 30, the exposure slot or aperture formed at A at the start of the curtain travel is of less dimension in its direction of travel than the exposure slot or aperture formed at B (Fig. 31) when the two shutter curtains approach the end of their travel across the said exposure opening 22b of the camera. This is to compensate for curtain acceleration. In other words, exposure time is dependent upon the width of the exposure slot or aperture and curtain speed, and since all shutter curtains accelerate in their travel from the curtain take-up roller to the curtain tension roller, it is necessary to provide means for compensating for this decreasing exposure speed. In the present invention I accomplish this by slightly increasing the width of the exposure slot or aperture A to the width indicated at B. I may, however, provide any compensation desired, as by adjusting or varying the diameter of the curtain take-up rollers 91, 92.

*The camera cycle.*—I will now refer to Fig. 3 and Figs. 10 to 16, and will describe a cycle of the camera when using the curtain shutter mechanism and the control therefor just described. Preliminarily, I state that thus far I have referred to a shutter mechanism having provision for one width only of the exposure slot or aperture. This is entirely satisfactory for a great number of uses of the camera herein disclosed, but for other uses of the camera it is necessary to be able to change the shutter exposure aperture width so as to provide a greater range of shutter speeds.

*The electrical circuit wiring.*—In Fig. 3, I have shown a diagram of the electrical circuit of the camera, and in Fig. 10 I show the camera mechanism in condition for making an exposure under the control of such circuit, Fig. 11 showing the condition of the mechanism when the shutter curtains have run all the way down.

The two-curtain shutter in the position of parts shown in Fig. 10 has been fully rewound and is held in position for making an exposure by means of the shutter release lever 250 and the stud or pin 116. The switch 225 is in open condition because the switch operating lever 233 has been moved to the right, viewing Fig. 10, by the spring 237, and the switch 212 is in condition to complete a circuit from the receptacle 279 that, as shown in Figs. 1, 2, 10 and 11, is attached to the mechanism plate 20 by means of screws 280, 280, inasmuch as the arm 221 of the bell crank 82 has been moved away from the switch pin 220, thus allowing the contacts 214 and 216 to be closed. The shutter will now be caused to operate if the external switch 281 is closed, which switch can be located anywhere convenient for the operator, and if desired within or upon the camera itself. It is shown merely diagrammatically in Fig. 3. A complete description of the wiring diagram shown in Fig. 3 is as follows:

One wire 282 from the switch 281 is connected to the terminal 283 of the receptacle 279 and a second wire 284 is connected to that terminal and extends to the contact 214 of the switch 212. Connecting contact 216 is a wire 285 that connects to a terminal 286 of a receptacle 287 (shown in Figs. 1, 10 and 11) which is held to mechanism plate 20 by means of screws 288. A lead wire 290 is connected to the terminal 286 of the receptacle 287 that leads to contact 227 of the switch 225 and connected to wire 290 is a short lead 291 that connects to the battery 292. The other side of the battery 292 is connected by wire 293 to the terminal 294 of said receptacle 287 and connected to the terminal 294 by a short wire 295 is a fuse 296. Also connected to said fuse 296 is a short wire that connects with one end of the resistor 297 and to one side of the switch 298. A wire 299 leads from said switch 298 and is connected to the other terminal of said resistor 297 and connects to a motor brake solenoid 300. Also connected to the wire 299 is one motor brush 301 and one side of the solenoid 251. The other side of said solenoid 251 is connected to the terminal 302 of said receptacle 279 by a wire 303. Connecting the contact 215 of said switch 212 is a wire 304 that connects to the motor brush 305 and to said motor brake solenoid 300. Also connected with the contact 215 of said switch 212 is a wire 306 that connects with the contact 226 of said switch 225, and connected with the contact 227 of the switch 225 is a wire 307 that connects to one side of the battery 292, and to said lead wire 290 that is connected with the terminal 286 of said receptacle 287.

When the mechanism is in the position of parts shown in Fig. 10, switch contacts 226, and 227 of switch 225 will be in open condition, and the contacts 214 and 216 will be in closed condition. Therefore, no current will flow to the motor 123 and no current will be flowing through the brake solenoid 300, but when the switch 281 is closed, current will flow from the battery 292 through wire 290, through wire 285, contacts 216 and 214, through wire 284, terminal 283, wire 282, switch 281, wire 308, terminal 302, solenoid 251, wire 299 and either through the resistor 297 or through switch 298 through fuse 296, through wire 295, terminal 294, wire 293 and back to the battery 292. The solenoid will now cause the shutter release lever 250 to be moved to the right, viewing Fig. 10, as previously described, releasing the two-curtain shutter which will be allowed to run down, as shown in Fig. 11. As the said shutter runs down, the pin 116 contacts with the lower end of the switch operating lever 233 causing the switch 225 to be operated, thereby closing contacts 226, and 227. Current will now flow from the battery 292 through wire 291, wire 307, contacts 226 and 227, wire 306 and 304, motor brush 305, through the motor to brush 301 through either the resistor 297 or the switch 298, through fuse 296, wire 295, terminal 294, and wire 293 to the battery 292. Since the brake solenoid 300 is in parallel with the brushes 301 and 305, current will flow through the solenoid 300, thus causing the motor brake to be relieved.

*The cycle of operation of the mechanism controlling the shutter rewind and the film.*—The electric motor 123 will now start to operate and through its speed reducing mechanism previously referred to, it will drive the interrupted gear 144 (Fig. 14) in a contraclockwise direction until the teeth thereof engage the teeth of the second interrupted gear 151, at which time the drive gear 157 will be turned in a clockwise direction and the idler gear 167 will be turned in a contraclockwise direction. The intermediate gear 184 will be turned in a clockwise direction and the main shutter rewind gear 117 in a contraclockwise direction, thereby rewinding the two-curtain shutter in the manner previously described. Soon after the said interrupted toothed gear 144 starts to rotate, the nose 82a of the bell crank 82 will be acted upon by the cam 146, causing the said bell crank 82 to be moved to the right, viewing Fig. 11, which movement in a contraclockwise direction causes switch operating pin 220 of the switch 212 to be operated, thereby opening the contacts 214 and 216 and breaking the circuit to the shutter release solenoid 251 and closing the contacts 215 and 216, which are shunted around the contacts 226, and 227 of the switch 225. This continues the circuit to the motor after the second curtain rewind gear 98 starts to rotate in a contraclockwise direction, thus carrying with it the stud or pin 116 from contact with the switch operating lever 233. The switch contacts 226 and 227 will then be caused to open by the spring 237 and the electric motor 123 will continue to operate until the interrupted toothed gear 144 has made a complete revolution, at which time the nose 82a of the bell crank lever 82 will drop off the cam 146, thus allowing the bell crank lever 82 to move to the left (that is, in a clockwise direction, viewing Figs. 10 and 11), thus allowing the switch operating pin 220 to move in a downward direction, causing the contacts 215 and 216 to be opened, thus stopping the motor. This completes the shutter rewind cycle.

At the commencement of the said cycle, the pin 148 carried on the crank member 147 is caused to turn in a contraclockwise direction, thus acting upon the cam-shaped formation 205 of the bell crank 203, causing the latter to be turned in a contraclockwise direction and at the same time withdrawing the pawl 206 from the teeth of ratchet wheel 194. The film feed clutch gear 150 will now be caused to be driven clockwise through the film feed clutch means, turning said film feed gear 67 contraclockwise, thus winding the film on the film take-up spool positioned on shaft 65 provided in the stud 60. Film will be drawn off the spool that is placed upon the studs 57 and 58 and will be fed around the idler roll 43, under the pressure pad or plate 56, around the measuring roll 47 and onto the take-up spool just referred to.

When sufficient film has passed over the surface of the measuring roll 47, the notch 208 of the measuring cam 51 will reach the position shown in Fig. 10, wherein the L-shaped finger-like member 207 of the bell crank 203 will drop into notch 208, thus allowing the bell crank 203 to be rotated in a clockwise direction. The pawl 206 will engage the teeth of the ratchet gear or plate 194, thus disengaging the film feed clutch gear 150 (Fig. 10), and no further film will be wound on the film take-up spool.

A complete cycle of operation has now taken place in the course of which the shutter has been released and has run down, the motor has been energized, the shutter has been completely rewound, and a new area of film has been fed into place. As the bell crank 82 was first moved to the right and then to the left viewing Figs. 10 and 11, the ratchet wheel 170 will have been caused to move a distance equal to one tooth of said ratchet wheel, thus advancing the film counter-dial one numeral, the film counter-dial previously having been set to the letter "S" when a new supply of film was placed in the camera. This can be readily done by rotating the knob 168 in a contraclockwise direction until the letter "S" appears in the window shown in dotted lines as provided in the cover plate 31 and indicated at 31a in Fig. 1. The letter "S" is used upon the camera in place of zero to signal the start of the first exposure.

The operation of the shutter and cooperating parts as thus set forth is therefore very clearly distinguished from the electrical control for functioning parts of an aerial camera set forth in a co-pending application filed in the names of Louis D. Nadel, Archie H. Gorey, Reynold J. Nitsch and Oscar Steiner, now Patent No. 2,371,592, dated March 13, 1945, wherein the shutter is operated mechanically for the making of a picture through cycling mechanism. Therefore, there is no delay in the shutter operation as the motor does not start to operate until the shutter has been operated and is entirely across the exposure aperture of the camera. Hence, it is impossible to have the cycle take place or even to begin before the shutter has traveled completely across the exposure opening of the camera. Therefore, no matter to how fast a speed the camera cycle is adjusted, it cannot in the present disclosure operate so fast that the shutter does not have time to travel all the way across the exposure opening of the camera, because the cycle cannot commence until the shutter has traveled all the way across the exposure opening, the rewind cycle being controlled from the shutter through the operating lever 233, co-acting with the pin 116 and the switch 225.

In the present disclosure there is provided a true self-capping variable aperture shutter. The shutter is always rewound in a capped condition and the exposure slot or aperture is established just as the shutter is completely rewound and before releasing it for an exposure. Such construction is therefore clearly distinguished from that shown in the patent to Petit and Hineline 1,980,546, dated November 13, 1934, wherein the exposure slot or aperture is adjusted by the operator prior to making an exposure and that exposure slot or aperture travels across the exposure opening both when making an exposure and when rewinding the shutter.

So far as I am aware, I believe that I am the first to provide any means to cause positively an increase in the size of the curtain exposure slot or aperture as the curtain travels across the exposure opening, thus compensating for the inevitable acceleration in the speed of the shutter curtain in its travel. As herein disclosed, I accomplish this result by providing curtain rewind rollers of contrasting diameter. I thus cause the exposure slot or aperture to enlarge as said exposure slot or aperture travels across the exposure opening of the camera at a controlled rate of speed, the means for accomplishing this being the difference in size of the two-curtain rewind rollers. If one of said rollers is larger than the other, the former will feed off more curtain substance than the other, and if the larger roller pertains to the leading curtain, this will cause the exposure slot or aperture to enlarge in size. If, however, the larger rewind roller pertains to the second or following curtain, this will cause the exposure slot or aperture to become smaller during curtain travel. While this feature of compensating for the inevitable acceleration in the speed of the shutter curtain intimately co-acts with the disclosed means for adjusting the size of the shutter exposure aperture prior to the release of the shutter, such matter is not so claimed herein but is so claimed in my divisional application Ser. No. 597,864.

Having thus described one illustrative embodiment of the invention, it is to be understood that although specific terms are employed, they are used in a generic and descriptive sense and not for purposes of limitation, the scope of the invention being set forth in the following claims.

I claim:

1. Motor-driven, self-capping, focal, two-curtain-shutter winding and releasing mechanism for a photographic camera including, in combination: two, closely parallel, cooperating curtains each having an aperture which together in the running-down movement of the shutter constitute the exposure aperture of the two-curtain self-capping shutter; tension rollers and take-up rollers arranged in respective pairs, supporting each of said curtains; a first curtain re-wind gear in meshing relation with the first curtain take-up roller; a second curtain rewind gear in meshing relation with the second curtain take-up roller; said rewind gears being mounted in parallel proximity to and co-axial with each other; one of said rewind gears having first and second curtain drive studs laterally projecting therefrom and the other rewind gear having a co-acting laterally projecting stud; one of said rewind gears having a shutter release stud laterally projecting therefrom; a movable shutter release member engageable by said shutter release stud in the rotative movement of the rewind gear bearing such stud and mounted laterally adjacent a face of such rewind gear; a main shutter rewind gear in driving relation with one of said rewind gears and co-axially mounted with respect to both of said rewind gears; an electric motor carried by the camera structure and in driving relation with said main shutter rewind gear; an electric circuit carried by said camera for actuating said electric motor and including a switch controlling said electric motor; a movable switch operating member laterally adjacent a face of the rewind gear carrying the shutter release stud and mounted in position to be engaged and operated by said shutter release stud, when at substantially the end of the running-down movement of the shutter and the accompanying rotative movement of the said stud-carrying rewind gears, the said shutter release stud comes into operating relation to said movable switch operating member, thereby starting said electric motor; the said drive and co-acting studs upon the said rewind gears being so positioned relative to each other and having such circumferential spaced location on adjacent faces of said gears that in the rotative movement of one of said rewind gears consequent upon the starting of said electric motor, the rotative movement of the other rewind gear is caused to occur by co-acting engagement of studs thereof and the two curtains are consequently rewound upon their take-up rollers respectively in such timed relation that said two curtains automatically cap each other during their said rewinding.

2. Motor-driven focal-plane-shutter winding and releasing mechanism for a photographic camera including, in combination, two closely parallel, cooperating curtains each having an aperture which together constitute the exposure aperture of the two curtain shutter; tension rollers and take-up rollers arranged in respective pairs supporting each of said curtains; a first curtain rewind gear in meshing relation with the first curtain take-up roller; a second curtain rewind gear in meshing relation with the second curtain take-up roller; said rewind gears being mounted in parallel proximity to each other; one of said rewind gears having stud-like projecting formations including first and second curtain drive formations and the other rewind gear having a co-acting projecting formation; one of said rewind gears having a shutter release stud-like projecting formation; a movable shutter release member engageable by said shutter release stud-like formation in the rotative movement of the rewind gear having such stud-like formation; a main shutter rewind gear in driving relation with one of said rewind gears; a motor in driving relation with said main shutter rewind gear; starting means for said motor mounted in position to be actuated by one of the projecting formations upon one of said first and second rewind gears when the shutter is substantially at the end of its running-down movement; the said drive studs upon the said rewind gears being so circumferentially spaced thereon and so positioned relative to each other that in the motor-caused relative movement of the first of said rewind gears such drive studs engage and cause the other rewind gear to turn and the two curtains are consequently rewound upon their respective take-up rollers in delayed time relation so that said two curtains cap each other during their said rewinding.

3. Motor-driven focal-plane-shutter winding and releasing mechanism for a photographic camera including, in combination, two closely parallel, cooperating curtains each having an aperture which together constitute the exposure aperture of the two-curtain shutter; tension rollers and take-up rollers arranged in respective pairs, supporting each of said curtains; a first curtain rewind gear in meshing relation with the first curtain take-up roller; a second curtain rewind gear in meshing relation with the second curtain take-up roller; said rewind gears being mounted in parallel proximity to each other; one of said rewind gears having first and second curtain drive studs laterally projecting therefrom and the other rewind gear having a co-acting laterally projecting stud; one of said gears having a shutter release stud laterally projecting therefrom; a movable shutter release member engageable by said shutter release stud in the rotative movement of the rewind gear bearing such stud; a main shutter rewind gear in driving relation with one of said rewind gears; an electric motor in driving relation with said main shutter rewind gear; electrical circuit wiring for actuating said electric motor and including a switch controlling said electric motor; a movable switch operating member mounted in position to be engaged and operated by said shutter release stud, carried by one of said rewind gears, when at substantially the end of the running-down movement of the shutter and the accompanying rotative movement of the said stud carrying rewind gears, the said shutter release stud comes into operating relation to said movable switch operating member, thereby starting said electric motor; the said drive studs upon the said rewind gears being so circumferentially spaced relative to each other that in and by reason of the rotative movement of one of said rewind gears consequent upon the starting of said electric motor, the rotative movement of the other rewind gear is caused to occur by co-action of the said driving studs and the two curtains are rewound upon their take-up rollers respectively in such timed relation that said two curtains cap each other during their said rewinding.

4. Motor-driven focal-curtain-shutter winding and releasing mechanism for photographic cameras in accordance with claim 3, but wherein said first and second curtain rewind gears and the main shutter rewind gear are loosely mounted on the same stud-like support.

5. Motor-driven focal-curtain-shutter winding and releasing mechanism for photographic cameras in accordance with claim 3, but wherein said first and second curtain rewind gears and the main shutter rewind gear are loosely mounted on the same stud-like support, and wherein upon the same stud-like support are also mounted a driving plate fast to said main shutter rewind gear and a rewind clutch member attached to said driving plate.

6. Motor-driven focal-curtain-shutter winding and releasing mechanism for photographic cameras in accordance with claim 3, but wherein there is provided a main drive shaft connected by gearing to said electric motor; and wherein between the said main drive shaft and the remainder of the shutter rewind mechanism there is provided interrupted gearing to furnish interrupted motion to such rewind shutter mechanism.

7. Motor-driven focal-curtain-shutter winding and releasing mechanism for photographic cameras in accordance with claim 3, but wherein there is provided a main drive shaft connected by gearing to said electric motor; and wherein between the said main drive shaft and the remainder of the shutter rewind mechanism there are provided two interrupted gears 144 and 151 having meshing relation with each other, to furnish interrupted motion to such rewind shutter mechanism.

8. Motor-driven focal-curtain-shutter winding and releasing mechanism for photographic cameras in accordance with claim 3, wherein the electric circuit for said electric motor includes a solenoid which, when energized, moves the shutter release member to release the two-curtain shutter and permit the running-down operation of the said shutter.

9. Motor-driven focal-curtain-shutter winding and releasing mechanism for photographic cameras in accordance with claim 3, but wherein the shutter release member is a lever 250, and wherein the electric circuit for said electric motor includes a solenoid which, when energized, moves the said lever 250 to release the two-curtain shutter and permit the running-down operation of the said shutter.

10. Motor-driven focal-curtain-shutter winding and releasing mechanism for photographic cameras in accordance with claim 3, but wherein the said first and second curtain rewind gears have laterally projecting from adjacent faces thereof, for driving contact in the rotation of said rewind gears, studs 110, 113 and 115, and from the other faces thereof, respectively, studs 111 and 116, and wherein means is provided to engage the said stud 111 to start the rotation of the rewind gear carrying the same, and wherein a shutter release lever 250 is provided to be engaged by the stud 116 to hold the shutter while so engaged.

11. Motor-driven focal-curtain-shutter winding and releasing mechanism for photographic cameras in accordance with claim 3, but wherein the said first and second curtain rewind gears have laterally projecting from adjacent faces thereof, for driving contact in the rotation of said rewind gears, studs 110, 113 and 115, and from the other faces thereof, respectively, studs 111 and 116, and wherein a rewind clutch member 119, 119a is provided to engage the said stud 111 to start the rotation of the rewind gear carrying the same, and wherein a shutter release lever 250 is provided to be engaged by the stud 116 to hold the shutter while so engaged, and wherein there is provided a main shutter rewind gear 117 receiving motion from said electric motor, for winding the two-curtain shutter.

12. Motor-driven focal-curtain-shutter winding and releasing mechanism for photographic cameras in accordance with claim 3, but wherein the said first and second curtain rewind gears have laterally projecting from adjacent faces thereof, for driving contact in the rotation of said rewind gears, studs 110, 113 and 115, and from the other faces thereof, respectively, studs 111 and 116, and wherein means is provided to engage the said stud 111 to start the rotation of the rewind gear carrying the same, and wherein a shutter release lever 250 is provided to be engaged by the stud 116 to hold the shutter while so engaged, and wherein, to start the rotation of the first of said first and second curtain rewind gears, there is provided upon the shaft for the said main shutter rewind gear a driving plate fast to said main shutter rewind gear and a rewind clutch member attached to said driving plate.

13. Motor-driven focal-curtain-shutter winding and releasing mechanism for photographic cameras in accordance with claim 3, but wherein the said first and second curtain rewind gears have laterally projecting from adjacent faces thereof, for driving contact in the rotation of said rewind gears, studs 110, 113 and 115, and from the other faces thereof, respectively, studs 111 and 116, and wherein a rewind clutch member 119, 119a is provided to engage the said stud 111 to start the rotation of the rewind gear carrying the same, and wherein a shutter release lever 250 is provided to be engaged by the stud 116 to hold the shutter while so engaged, and wherein there is provided a main shutter rewind gear 117 receiving motion from said electric motor, for winding the two-curtain shutter, and wherein the circumferential location and spacing of the said studs on the said first and second curtain rewind gears is such that after the first curtain has traveled a sufficient distance to cap the second curtain the said second curtain is partially rewound on its take-up roller.

14. Motor-driven focal-curtain-shutter winding and releasing mechanism for photographic cameras in accordance with claim 3, but wherein the switch controlling the electric motor is the switch 232 having contacts 226, 227, and wherein the movable switch operating member is the lever 233 mounted so that one arm thereof is positioned to overlap the face of the second curtain rewind gear having the laterally projecting shutter release stud, so as to be engaged and operated by said shutter release stud when the shutter has run down, thereby to move said switch 232 to start the said electric motor.

15. Motor-driven focal-curtain-shutter winding and releasing mechanism for photographic cameras in accordance with claim 3, but wherein the electric circuit for the said electric motor is provided with a switch 212 for controlling shutter movements and also the motor and having contacts 214, 215, 216, and wherein, to engage and operate the said switch, there is provided a lever 82 and a cam 146 rotated by said electric motor to operate said lever 82.

16. Motor-driven focal-curtain-shutter winding and releasing mechanism for photographic cameras in accordance with claim 3, but wherein the first curtain take-up roller is of a slightly larger diameter than the second curtain take-up roller to allow the first curtain, in the making of the exposure, to move at a slightly greater rate than the second curtain, thereby to cause the exposure aperture to increase as the two curtains travel across the exposure opening of the camera in making the exposure, thus to compensate for curtain acceleration that otherwise would result in decreasing exposure speed.

17. Motor-driven focal-curtain-shutter winding and releasing mechanism for photographic cameras in accordance with claim 3, but wherein the movable shutter release member is a lever 250 and the movable switch operating member is a lever 233, and wherein both of said levers are at the same side of and in proximity to the second curtain rewind gear, and wherein the said second curtain rewind gear is provided with the shutter release stud 116, which in sequence engages and operates said levers 250 and 233.

18. Motor-driven focal-curtain-shutter winding and releasing mechanism for photographic cameras in accordance with claim 3, but wherein the movable shutter release member is a lever 250 and the movable switch operating member is a lever 233, and wherein both of said levers are at the same side of and in proximity to the second curtain rewind gear, and wherein the said second curtain rewind gear is provided with the shutter release stud 116, which in sequence engages and operates said levers 250 and 253, and wherein the said first and second curtain rewind gears have laterally projecting from adjacent faces thereof studs 110, 113 and 115 for driving contact in the rotation of said gears.

19. Motor-driven focal-curtain-shutter winding and releasing mechanism for photographic cameras in accordance with claim 3, but wherein means are provided, acting during the rewinding of both curtains, and after both curtain apertures have, in rewinding, traveled past the exposure opening of the camera, to release the first curtain and permit it to run back a short predetermined distance, thereby to form the exposure aperture by thus placing the two-curtain apertures in alignment.

20. Motor-driven focal-curtain-shutter winding and releasing mechanism for photographic cameras in accordance with claim 3, but wherein means are provided to release the said main rewind gear from driving relation with said first and second curtain rewind gears, for the running-down movement of the shutter, so that said main rewind gear does not rotate during the running-down movement of the shutter.

21. Motor-driven focal-curtain-shutter winding and releasing mechanism for photographic cameras in accordance with claim 3, but wherein the said first and second curtain rewind gears have laterally projecting from adjacent faces thereof, for driving contact in the rotation of said rewind gears, studs 110, 113 and 115, and from the other faces thereof, respectively, studs 111 and 116, and wherein a clutch member is provided to engage said stud 111 to start the rotation of the rewind gear carrying the same.

EDSON S. HINELINE.